United States Patent
Fujimoto et al.

(10) Patent No.: US 7,213,104 B2
(45) Date of Patent: May 1, 2007

(54) DISK ARRAY CONTROL DEVICE WITH AN INTERNAL CONNECTION SYSTEM FOR EFFICIENT DATA TRANSFER

(75) Inventors: Kazuhisa Fujimoto, Kokubunji (JP); Atsushi Tanaka, Urawa (JP); Akira Fujibayashi, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 185 days.

(21) Appl. No.: 10/990,496

(22) Filed: Nov. 18, 2004

(65) Prior Publication Data

US 2005/0071552 A1   Mar. 31, 2005

Related U.S. Application Data

(63) Continuation of application No. 10/822,710, filed on Apr. 13, 2004, now Pat. No. 6,839,805, which is a continuation of application No. 10/407,456, filed on Apr. 7, 2003, now Pat. No. 6,745,287, which is a continuation of application No. 09/478,341, filed on Jan. 6, 2000, now Pat. No. 6,578,108.

(30) Foreign Application Priority Data

Jan. 7, 1999   (JP)   ................................. 11-001668

(51) Int. Cl.
*G06F 12/00* (2006.01)

(52) U.S. Cl. ............. 711/114; 711/113; 711/130; 711/131

(58) Field of Classification Search ............ None
See application file for complete search history.

(56) References Cited

U.S. PATENT DOCUMENTS 5,155,835 A   10/1992   Belsan

| | | |
|---|---|---|
| 5,206,939 A | 4/1993 | Yanai et al. |
| 5,237,573 A | 8/1993 | Dhuey et al. ................ 327/407 |
| 5,499,981 A | 3/1996 | Kordis .......................... 606/41 |
| 5,583,876 A | 12/1996 | Kakuta |
| 5,752,256 A | 5/1998 | Fujii et al. |
| 5,819,054 A | 10/1998 | Ninomiya et al. |
| 5,822,779 A | 10/1998 | Intrater et al. ............... 710/107 |

(Continued)

FOREIGN PATENT DOCUMENTS

EP   689143   12/1995

(Continued)

OTHER PUBLICATIONS

Japanese Patent Office communication - Office Action mailed on Jan. 18, 2007, 3 pages, translated.

*Primary Examiner*—Kevin Verbrugge
(74) *Attorney, Agent, or Firm*—Mattingly, Stanger, Malur & Brundidge, P.C.

(57) ABSTRACT

A disk array controller which includes a channel interface unit for connecting a host computer through a first type channel, a channel interface unit for connecting a host computer through a second type channel, a plurality of disk interface units provided with an interface with a magnetic disk unit respectively, a cache memory unit, and a shared memory unit. The number of access paths connected to said cache memory unit is less than the number of access paths connected to the shared memory unit.

5 Claims, 17 Drawing Sheets

U.S. PATENT DOCUMENTS

| | | | |
|---|---|---|---|
| 5,920,893 | A | 7/1999 | Nakayama et al. |
| 6,578,108 | B1 | 6/2003 | Fujimoto et al. |
| 6,745,287 | B2 | 6/2004 | Fujimoto et al. |

FOREIGN PATENT DOCUMENTS

| | | |
|---|---|---|
| EP | 769744 | 4/1997 |
| JP | 05143242 | 6/1993 |
| JP | 6332626 | 12/1994 |
| JP | 720994 | 1/1995 |
| JP | 7328072 | 12/1995 |
| JP | 07328072 | 12/1995 |
| JP | 9120373 | 5/1997 |
| JP | 9-198308 | 7/1997 |
| JP | 9325905 | 12/1997 |
| JP | 10-333836 | 12/1998 |

DISK ARRAY CONTROL DEVICE WITH AN INTERNAL CONNECTION SYSTEM FOR EFFICIENT DATA TRANSFER

The present application is a continuation of application Ser. No. 10/822,710, filed Apr. 13, 2004 now U.S. Pat. No. 6,839,805; which is a continuation of application Ser. No. 10/407,456, filed Apr. 7, 2003, now U.S. Pat. No. 6,745,287; which is a continuation of application Ser. No. 09/478,341, filed Jan. 6, 2000, now U.S. Pat. No. 6,578,108, the contents of which are incorporated herein by reference.

BACKGROUND OF THE INVENTION

The present invention relates to control devices of disk array devices for storing data in a plurality of magnetic disk devices.

In view of the fact that the input/output (I/O) performance or throughput of a disk subsystem (referred to as a "subsystem" hereinafter) is less by approximately three to four orders of magnitude than the I/O throughput of main memories of computers which use semiconductor memory devices as their storage media, attempts have conventionally been made to reduce this difference, namely, to improve the I/O throughput of the subsystem. One prior known approach to improving the subsystem's I/O throughput is to use a system, called a "disk array", for constituting the subsystem from a plurality of magnetic disk devices, such as fixed or "hard" disk drives (HDDs), which are applicable for use in storing data.

FIG. 2 shows an arrangement typical of one known type of disk array. This includes a plurality of channel interface (IF) units 411 for execution of data transmission between a mainframe 50 and a disk array controller 2, a plurality of disk IF units 414 for execution of data transfer between HDDs 20 and the disk array control unit 2, a cache memory unit 14 for temporarily storing data of the HDDs 20, and a shared memory unit 15 for storing control information relevant to the disk array controller 2 (for example, information concerning data transfer control between the channel units 411 and disk IF units 414 and the cache memory unit 14), wherein the cache memory unit 14 and shared memory unit 15 are arranged so that they are accessible from all of the channel IF units 411 and disk IF units 414. With this disk array, the channel IF units 411 and disk IF units 414 are connected to the shared memory unit 15 on a one-to-one basis; similarly, the channel IF units 411 and disk IF units 414 are connected one by one to the cache memory unit 14. This connection form is called a star connection.

The channel IF unit 411 has an interface for connection with the mainframe 50 and also a microprocessor (not shown) for controlling input/output with respect to the mainframe 50. The disk IF unit 414 has an interface for connection to the HDDs 20 and a microprocessor (not shown) for controlling input/output relative to HDDs 20. The disk IF unit 414 also executes RAID functions.

FIG. 3 shows the configuration of another known disk array. It includes a plurality of channel IF units 411 for execution of data transfer between a mainframe 50 and a disk array controller 3, a plurality of disk IF units 414 for execution of data transfer between HDDs 20 and the disk array controller 3, a cache memory unit 14 for temporarily storing data of the HDDs 20, and a shared memory unit 15 for storing control information relevant to the disk array controller 3 (e.g. information concerning data transfer control between the channel units 411 and disk IF units 414 and the cache memory unit 14), wherein each of the channel IF units 411 and disk IF units 414 is connected by a shared bus 130 to the shared memory unit 15; whereas, each channel unit 411 and disk IF unit 414 is connected by a shared bus 131 to the cache memory unit 14. Such a connection form is called a shared bus connection.

In order to make the architecture of a disk array scalable, the number of disk IF units must be increased according to the capacity of the disk (the number of logical volumes) connected to a disk controller. In addition, the number of channel IF units in the object disk array controller must be increased according to the necessary number of channels connected to the host computer. For a disk array controller that employs the shared bus connection form, however, increasing the number of channel IF units and disk IF units degrades the data transfer throughput of the access path between each of the channel IF units and/or the disk IF units and a cache memory unit or a shared memory unit which is to become scalable according to an increase in the number of channel IF units or disk IF units. This is because the shared bus becomes a bottleneck in making the access path throughput scalable.

Furthermore, in the case of the shared bus connection form, if a high performance microprocessor is employed for each of those channel IF units and/or the disk IF units, the transfer capacity of the shared bus cannot cope with the processor performance, thereby the shared bus can hardly keep up with the high speed operation of the processor.

Furthermore, in the case of the shared bus connection form, if an operation error occurs in any of those channel IF units (or disk IF units) connected to the shared bus, it is difficult to identify the error-detected channel IF unit (or disk IF unit).

On the contrary, in the disk array controller of the star connection form, it is possible to increase the internal path performance or throughput in a way proportional to the number of access paths being connected to either the shared memory unit or cache memory unit, which in turn makes it possible to increase the throughput of the internal paths in accordance with the add-in reconfiguration of the channel and disk IF units or alternatively with the performance of the processors being used. In addition, since the star connection is used between the channel IF and disk IF units and the cache memory unit or between the channel and disk IF units and the shared memory unit, it is easy to specify a channel IF unit (or disk IF unit) at which an operation failure has occurred.

In the disk array controller of the star connection form, increasing the number of those channel IF units or disk IF units which are built therein would result in an increase in the number of access paths between the channel and disk IF units and the cache memory unit and between the channel and disk IF units and the shared memory unit. Additionally, the throughput called for by disk array control devices tends to further increase due to employment of high-speed channels, such as a fiber optic channel, for connection between host computers and disk array controllers; therefore, in order to satisfy this need for improvement of the throughput, it should be effective to increase the number of access paths between the channel and the disk IF units and the cache memory unit and between the former and the shared memory unit to thereby improve the internal path throughput.

However, the amount of data in a single data segment or datum to be stored in the cache memory is much greater than the amount of data in a single control information item being stored in the shared memory. As an example, in a disk control device connected to a mainframe, a single datum being stored in the cache memory is several kilobytes (KB) or more or less (for example, 2 KB), whereas one control information item stored in the shared memory is several bytes or therearound (e.g. 4 bytes). As another example, in disk control devices connected to host computers of open architectures, a single datum as stored in the cache memory is several tens of bytes (e.g. 64 bytes), whereas a single control information item stored in the shared memory is about several bytes (e.g. 4 bytes). Accordingly, the amount of data to be transferred between the channel and the disk IF units and the cache memory unit is extremely greater than the amount of data being transferred between the channel and disk IF units and the shared memory unit, which leads to a need for letting the data width of an access path between the channel and disk IF units and the cache memory unit be wider than the data width of an access path between the channel and disk IF units and the shared memory unit. For instance, the access path of the former is constituted from a 16-bit width bus, whereas the latter is constituted from a 4-bit width bus. For this reason, increasing the line number of access paths between the channel and disk IF units and the cache memory unit would result in creation of a problem of shortage of the number of pins in an LSI(s) of the cache memory unit and shortage of the number of pins in a connector of the cache memory unit package for connection of the access paths thereof.

On the other hand, in order to reduce the response time from the disk array controller to the host computer, the time of access to the control information stored in the shared memory must also be as short as possible.

Furthermore, along with the spread of open systems in recent years, storage sub-systems supporting a multi-platform are now high on the wish list. Concretely, the same disk array controller must be used to support such fast interfaces as fiber optic channels, etc. and such slow interfaces for ESCON (Enterprise Systems Connection: ESCON is a registered trademark of International Business Machines USA, Corp.) channels whose throughput is as slow as several tens of MB/sec, SCSI (Small Computer System Interface) channels, etc. Consequently, for example, it is necessary that channel IF units or disk IF units for high throughput fiber optic channels and channel IF units or disk IF units for low throughput SCSI channels must be mounted in the same disk array controller and operated at the same time. For this purpose, therefore, it must be efficient to make an access between each of the channel IF units and/or the disk IF units provided with different types of interfaces and a cache memory.

SUMMARY OF THE INVENTION

Under the circumstances, it is an object of the present invention to provide a disk array controller that can solve the above problems, that can make it possible to use every access path efficiently between each of the channel IF units and/or the disk IF units and a cache memory, and that will include a cache memory unit having a high throughput of data transfer.

In order to achieve the above objects, the disk array controller of the present invention includes a first channel interface unit for connecting a first host computer through a first type channel; a second channel interface unit for connecting a second host computer through a second type channel, which is different in type from the first type channel; a plurality of disk interface units having an interface with a magnetic disk unit, respectively; a cache memory connected to a plurality of the channel interface units and a plurality of the disk interface units and which is used for storing data to be read/written from/in the magnetic disk units temporarily; a shared memory connected to a plurality of the channel interface units and a plurality of disk interface units and which is used for storing control information related to data transfer between each of the channel interface units and/or the disk interface units and the cache memory. And, the disk array controller is composed so that the number of access paths connected to the cache memory is less than the number of access paths connected to the shared memory.

Preferably, the disk array controller should further include a selector unit connected to the first and second channel interfaces unit, the disk interface units, and the cache memory. The first and second channel interface units and the disk interface unit are connected to the selector unit through an access path, respectively, in a one-by-one manner. The selector unit and the cache memory are also connected to each other through an access path. The total number of access paths for the connection between the first and second channel interface units and/or the disk interface unit and the selector unit is more than the total number of access paths for the connection between the selector unit and the cache memory unit. And, the first and second channel interface units and the disk interface units are connected to the selector unit and the shared memory through an access path, respectively, in a one-by-one manner.

The disk array controller should preferably be provided with a plurality of the selector units. The first channel interface units and the second channel interface units should be connected to different selector units.

Furthermore, the disk array controller of another embodiment is provided with a first channel interface unit for connecting a first host computer through a first type channel; a second channel interface unit for connecting a second host computer through a second type channel, which is different in type from the first type channel; a plurality of disk interface units having an interface with a magnetic disk unit, respectively; a cache memory connected to a plurality of the channel interface units and a plurality of the disk interface units and which is used for storing data to be read/written from/in the magnetic disk units; a shared memory connected to a plurality of the channel interface units and a plurality of the disk interface units and which is used for storing control data related to the data transfer between each of the channel interface units and/or the disk interface units and the cache memory. Each cache memory access controller and the cache memory is connected to each other by an access path through a selector unit and each shared memory access controller and the shared memory are connected to each other directly through an access path.

Furthermore, the disk array controller should preferably be composed so that the number of access paths for the connection between the first and second channel interface units and/or the disk interface units and the selector unit is equal to the number of access paths for the connection between the first and second channel interface units and/or the disk interface units and the shared memory unit. The number of access paths for the connection between the selector unit and the cache memory is less than the number of access paths for the connection between the first and second channel interface units and/or the disk interface units and the selector unit.

Furthermore, the disk array controller of another embodiment includes a first host interface group; a second host interface group; a first disk interface group; a second disk interface group; a first selector unit connected to the first host interface group and the disk interface group through a first access path; the second selector unit connected to the second host interface group and the first disk interface group through a second access path; and a cache memory connected to the first and second selector groups. In the disk array controller, the bandwidth of the first access paths is set equally to that of the second access paths.

Each of the first and second host interface groups should preferably include a host interface for the first type channels and a host interface for the second type channels, which is narrower than the bandwidth of the first type channels. Each of the first and second disk interface groups should preferably include a disk interface for the first type channels and a disk interface for the third type channels, which is narrower than the bandwidth of the first type channels.

The disk array controller of another embodiment is provided with a first selector unit, a second selector unit, and a cache memory connected to the first and second selector units. The first selector unit is connected to k (k: a natural number) host interface units for the first type channels; l (l: a natural number) host interfaces for the second type channels; m (m: a natural number) disk interface units for the first type channels; and n (n: a natural number) host interface units for the third type channels. The second selector unit is connected to k (k: a natural number) host interface units for the first type channels, which are different from the host interface units connected to the first selector unit; l (l: a natural number) host interfaces for the second type channels, which are different from the host interface units connected to the first selector unit; m (m: a natural number) disk interface units for the first type channels, which are different from the disk interface units connected to the first selector unit; and n (n: a natural number) host interface units for the third type channels, which are different from the disk interface units connected to the first selector unit.

The disk array controller of another embodiment is provided with a first selector unit connected only to host interface units for the first type channels and disk interface units for the first type channels; a second selector unit connected to host interface units for channels which are not the first type channels and disk interface units for channels which are not the first type channels; and a cache memory unit connected to the first and second selector units.

The bandwidth of the first type channels should preferably be wider than that of another type of channels, which are not the first type channels.

The bandwidth of the access path for connection between the first selector unit and the cache memory unit should preferably be wider than that for connection between the second selector unit and the cache memory unit.

DETAILED DESCRIPTION OF THE PREFERRED EMBODIMENTS

Hereunder, the preferred embodiments of the disk array controller of the present invention will be described with reference to the accompanying drawings.

Figure 1:
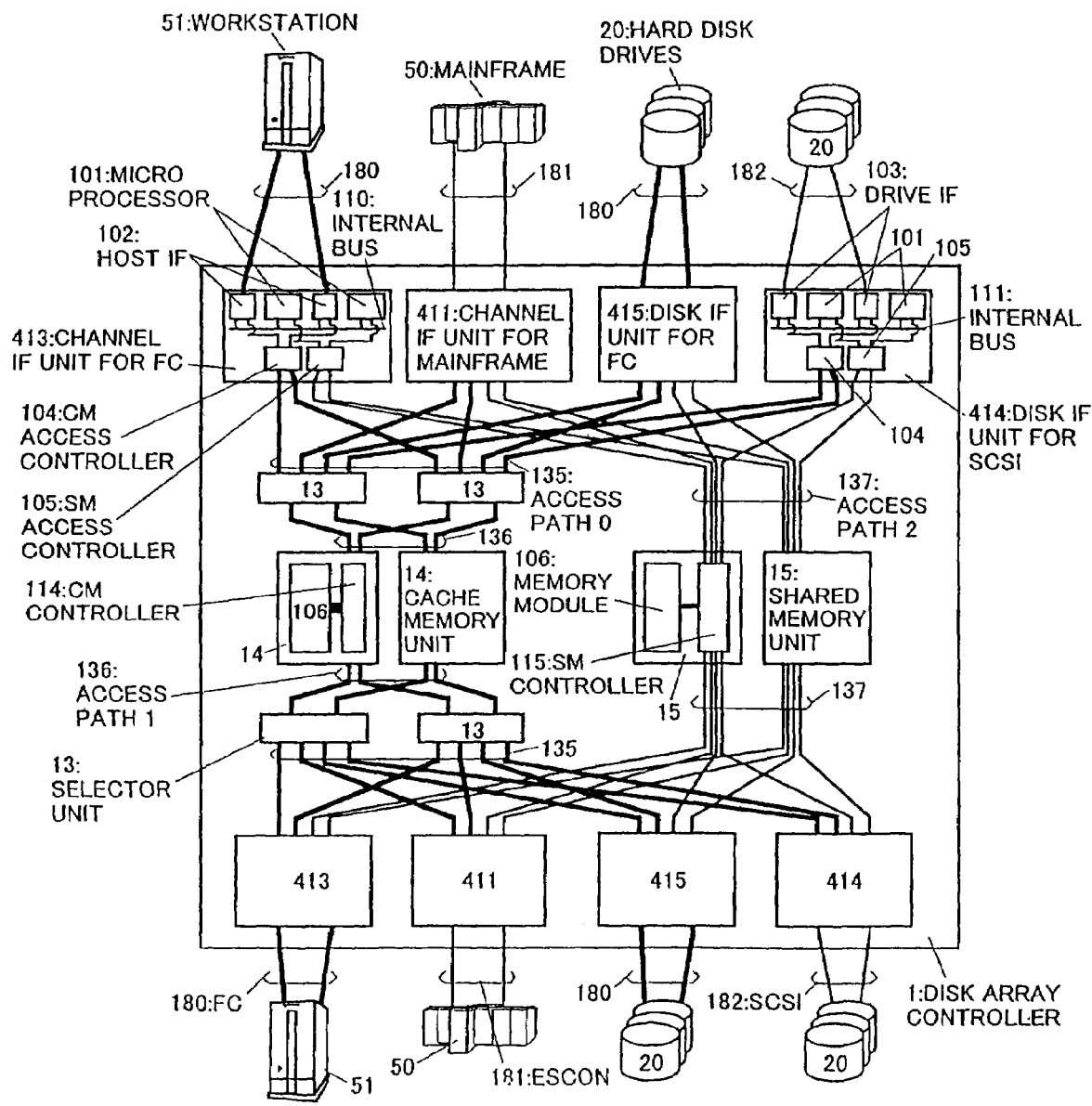
FIG. 1 is a block diagram of a disk array controller representing an embodiment of the present invention.

FIG. 1 is a block diagram of a disk array controller representing an embodiment of the present invention.

The disk array controller 1 is mainly composed of two channel IF units 411 for connecting two main frames 50; two channel IF units 413 for FCs (Fiber Optic Channels) for connecting two work stations 51; two disk IF units for SCSI 414 for connecting magnetic disk units 20; two disk IF units for FC 415 for connecting magnetic disk units 20; four selector units 13; two cache memory units 14; two shared memory units 15; access paths 0:135; access paths 1:136; and access paths 2:137. In this embodiment, the access paths 0:135 and the access paths 1:136 are assumed to be all equal in bandwidth per line (for example, 200 MB/sec). Hereafter, both of the main frame 50 and the work station 51 may be referred to as host computers for convenience of description.

Each of the channel IF units for mainframe 411 and the channel IF units for FC 413 is composed of two IF (host IF) units 102 for two host computers; two microprocessors 101 for controlling the input/output to/from those two host computers; an access controller (CM access controller) 104 for controlling the access to the cache memory unit 14; and an access controller (SM access controller) 105 for controlling the access to the shared memory unit 15. The channel IF unit for mainframe 411 and the channel IF unit for FC 413 are used to transfer data between the host computer 50 and the cache memory 14 and between the micro processor 101 and the shared memory unit 15. Each microprocessor 101 and each host IF unit 102 are connected to each other through an internal bus 110. The CM access controller 104 and the SM access controller 105 are connected to the two host IF units 102, respectively.

Each of the disk IF units for SCSI 414 and the disk IF units for FC 415 is composed of two IF (drive IF) units 103 connected to magnetic disk units 20; two microprocessors 101 for controlling the input/output to/from magnetic disk units 20; an access controller (CM access controller) 104 for controlling the access to the cache memory unit 14; an access controller (SM controller) 105 for controlling the access to the shared memory unit 15. Each of the disk IF units for SCSI 414 and the disk IF units for FC 415 is used to transfer data between each magnetic disk unit 20 and the cache memory unit 14 and between each microprocessor 101 and the shared memory unit 15. The microprocessor 101 and the drive IF unit 103 are connected to each other through an, internal bus 111. The CM access controller 104 and the SM access controller 105 are connected to the two drive IF units 103, respectively. Each disk IF unit also executes RAID functions.

The cache memory unit 14 has a cache memory (CM) controller 114 and a memory module 106 and stores data to be recorded in each magnetic disk unit 20. In addition, the shared memory unit 15 has a shared memory (SM) controller 115 and a memory module 106 and stores control data.

Next, one of the features of this embodiment will be described. The feature relates to the form of the connection between each of the channel IF units for mainframe 411, the channel IF units for FC 413, the disk IF units for SCSI 414, the disk IF units for FC 415 and the cache memory unit 14 and/or the shared memory unit 15.

Two access paths 0:135 are connected to each CM access controller 104 provided in each of the channel IF units for mainframe 411, the channel IF units for FC 413, the disk IF units for SCSI 414, and the disk IF units for FC 415. Those two access paths 0:135 are also connected to dual selector units 13. One of the dual selector units is connected to four access paths 0:135 from one channel IF unit for mainframe 411, from one channel IF unit for FC 413, from one disk IF unit for SCSI 414, and from one disk IF unit for FC 415. The other selector unit 13 is connected to two access paths 1:136. Those two access paths 1:136 are connected to the CM controller 114 provided in each of the dual cache memory units 14. Consequently, the CM controller 114 is connected to four access paths 1:136 from the four selector units 13.

Each selector unit 13 is provided with a function for selecting only two access requests if the number of access requests from the channel IF units for mainframe 411, the channel IF units for FC 413, the disk IF units for SCSI 414, the disk IF units for FC 415, the channel IF units 11, or the disk IF units 12 is more than two, which is equal to the number of access paths 1:136 to a cache memory unit 14.

In order to improve the data transfer throughput of the disk array controller 1, it is effective to improve the performance of the internal bus by increasing the number of access paths for the connection between each of the channel IF units for mainframe 411, the channel IF units for FC 413, the disk IF units for SCSI 414, and the disk IF units for FC 415 and the cache memory unit. If the number of access paths is increased, however, the data width of the access path must be widened between each of the channel IF units for mainframe 411, the channel IF units for FC 413, the disk IF units for SCSI 414, and the disk IF units for FC 415, and the cache memory unit as described above. However, this will cause a bottleneck to arise from the LSI pins of the cache memory unit 14 and the connector of the LSI package. To avoid such a problem in this embodiment, the number of access paths connected to the cache memory unit 14 from one of the selector units 13 is disposed to be less than that connected to one selector unit 13 from the channel IF units for mainframe 411, the channel IF units for FC 413, the disk IF units for SCSI 414, and the disk IF units for FC 415, and the total number of units (of the channel IF units for mainframe 411, the channel IF units for FC 413, the disk IF units for SCSI 414, and the disk IF units for FC 415) is set to be less than that of the selector units 13, whereby the number of access paths connected to the cache memory unit 14 is reduced.

The selector unit 13 is dualized and two routes are secured for accessing one cache memory unit 14 from one channel IF unit for mainframe 411, one channel IF unit for FC 413, one disk IF unit for SCSI 414, and one disk IF unit for FC 415, respectively, in this embodiment so that one of the access routes to the cache memory unit 14 is secured even when an operation error occurs in one of the access routes, thereby improving the error resistance of the disk array controller 1.

Figure 2:
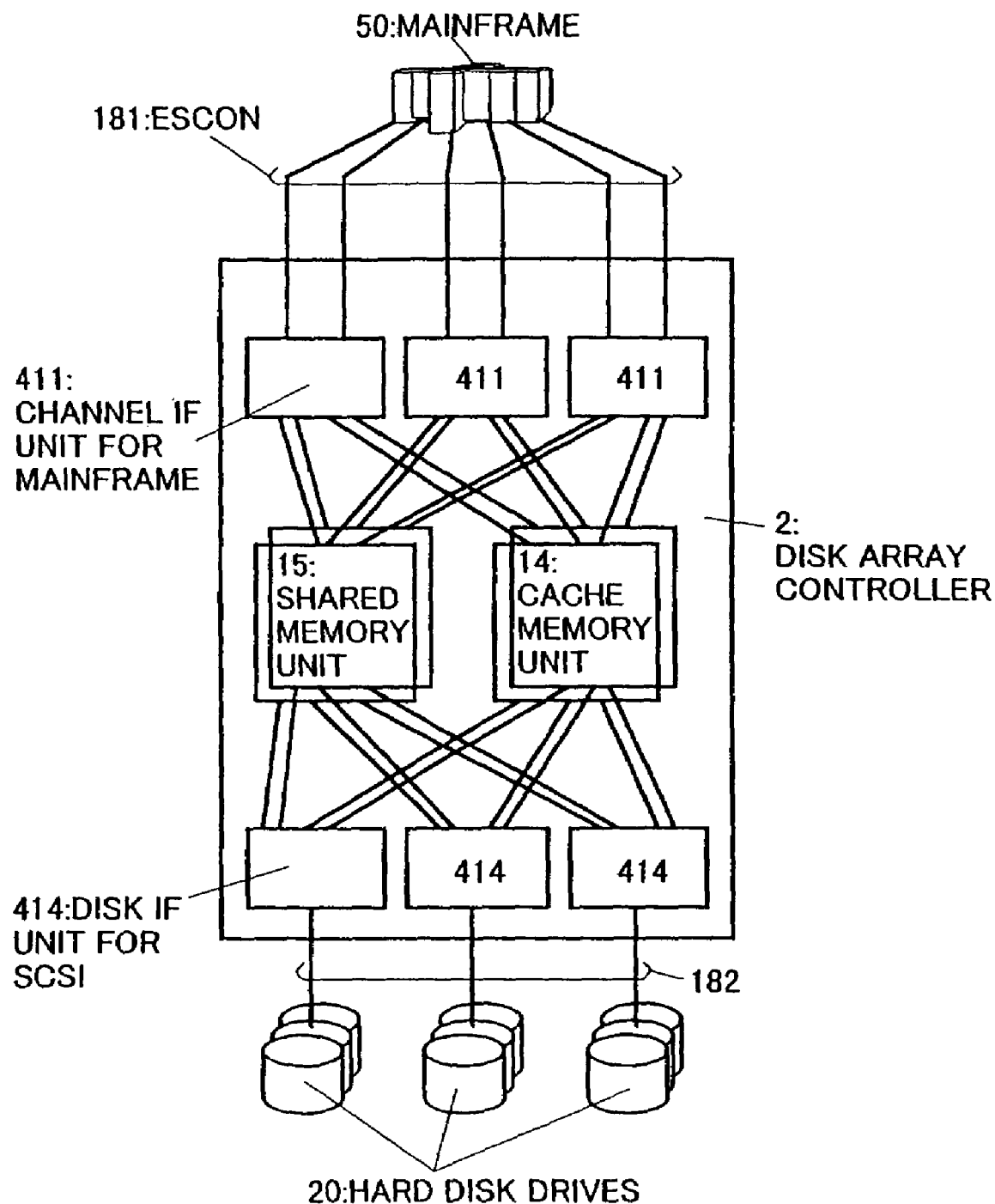
FIG. 2 is a block diagram of a prior art disk array controller.
Figure 3:
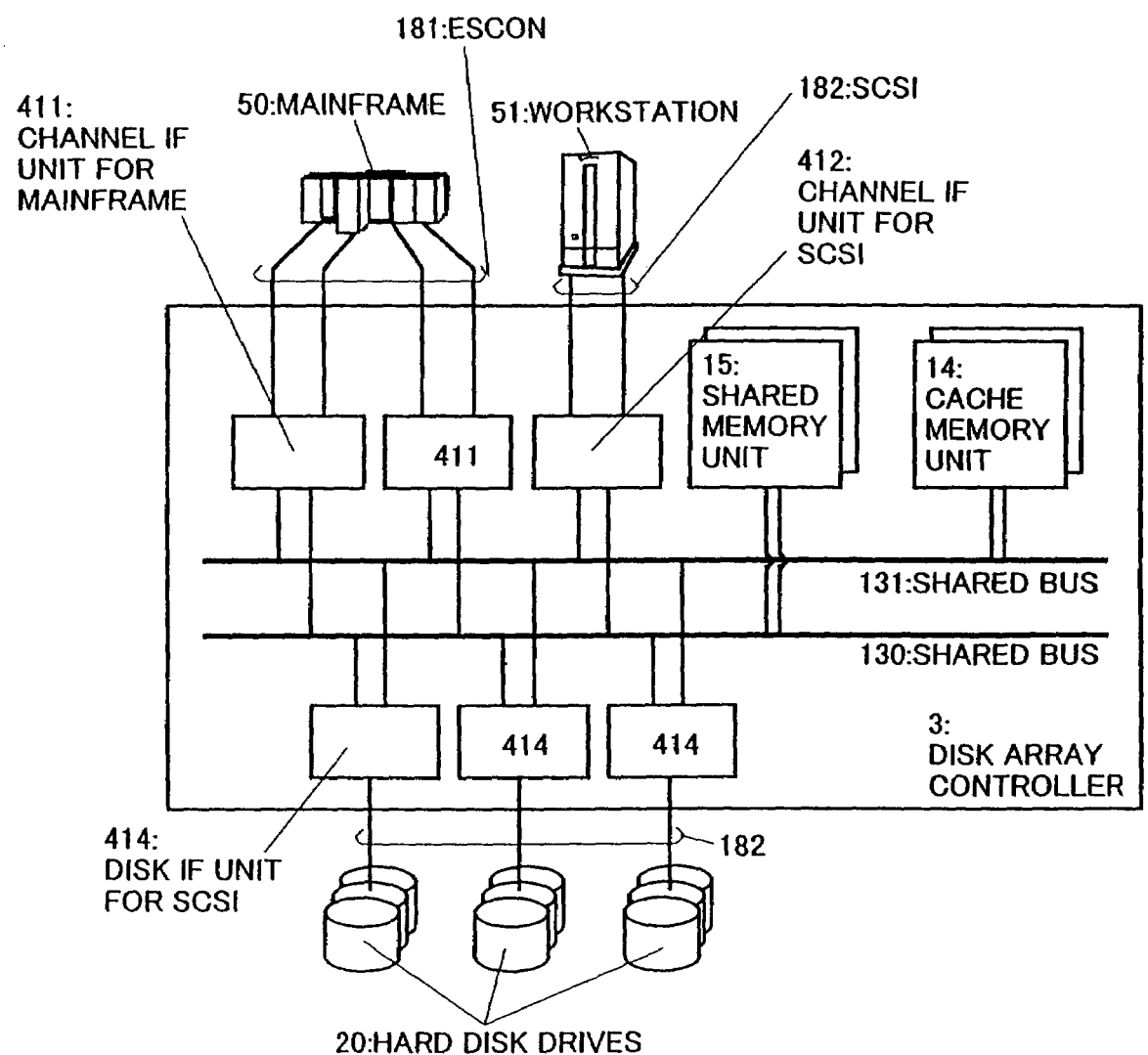
FIG. 3 is a block diagram of another prior art disk array controller.

On the other hand, in order to reduce the time of response to each host computer of the disk array controller 1, the time of access to the control data stored in the shared memory unit 15 must be minimized. Just like between the CM access controller 104 and the CM controller 114 shown in FIG. 1, if the SM access controller 105 and the SM controller 115 are connected to each other through a selector unit, the overhead of the processing in the selector unit would become an obstacle to any reduction in the time of access. In addition, as described above, because the length of one control data item stored in the shared memory unit 15 is considerably shorter than that of one data item stored in the cache memory unit 14, the data width of the access path 2:137 can be reduced to not more than a half of that of the access path 0:135. Consequently, increasing the number of access paths to the shared memory unit 15 will hardly cause such a problem as shortage in the number of LSI pins of the shared memory controller (not illustrated in FIG. 2) provided in the shared memory unit. This is why the access path 2:137 provides a direct connection between each SM access controller 105 provided in each of the channel IF units for mainframe 411, the channel IF units for FC 413, the disk IF units for SCSI 414, and the disk IF units for FC 415 and the SM controller 115 provided in the shared memory unit 15.

Next, accessing the cache memory unit 14 from each of the channel IF units for mainframe 411, the channel IF units for FC 413, the disk IF units for SCSI 414, and the disk IF units for FC 415 will be described.

Figure 4:
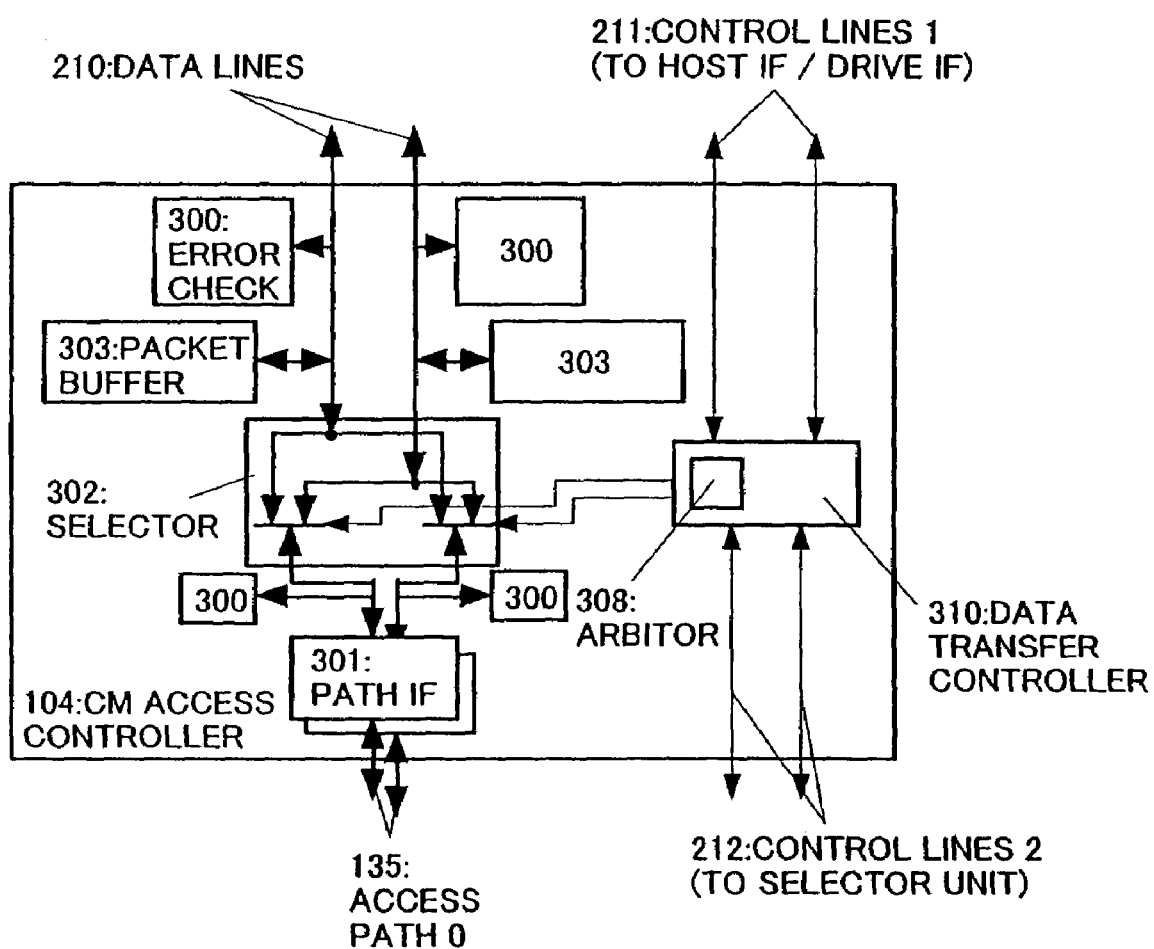
FIG. 4 is a block diagram of a CM access controller provided in the disk array controller of the present invention.

FIG. 4 shows an internal configuration of the CM access control unit 104. The CM access control unit 104 has a selector 302, packet buffers 303 for temporary storage of an address and command, as well as data, a path IF 301 associated with the access path 0:135 coupled to the selector units 13, data error check units 300, and a data transfer control unit 310. Two ports of the selector 302 are connected by data lines 210 to either host IFs 102 or drive IFs 103. The other two ports of the selector 302 are connected to the path IF 301. The path IF 301 is connected by access paths 0:135 to the selector units 13. The data transfer control unit 310 is connected by control lines 1:211 to either the host IFs 102 or the drive IFs 103, and is connected by control lines 2:212 to data transfer control units 315 within the selector units 13. In addition, the data transfer control unit 310 includes an arbiter 308 for performing arbitration of access requests from either the host IF 102 or the drive IFs 103 while performing switching of the selector 302.

Figure 5:
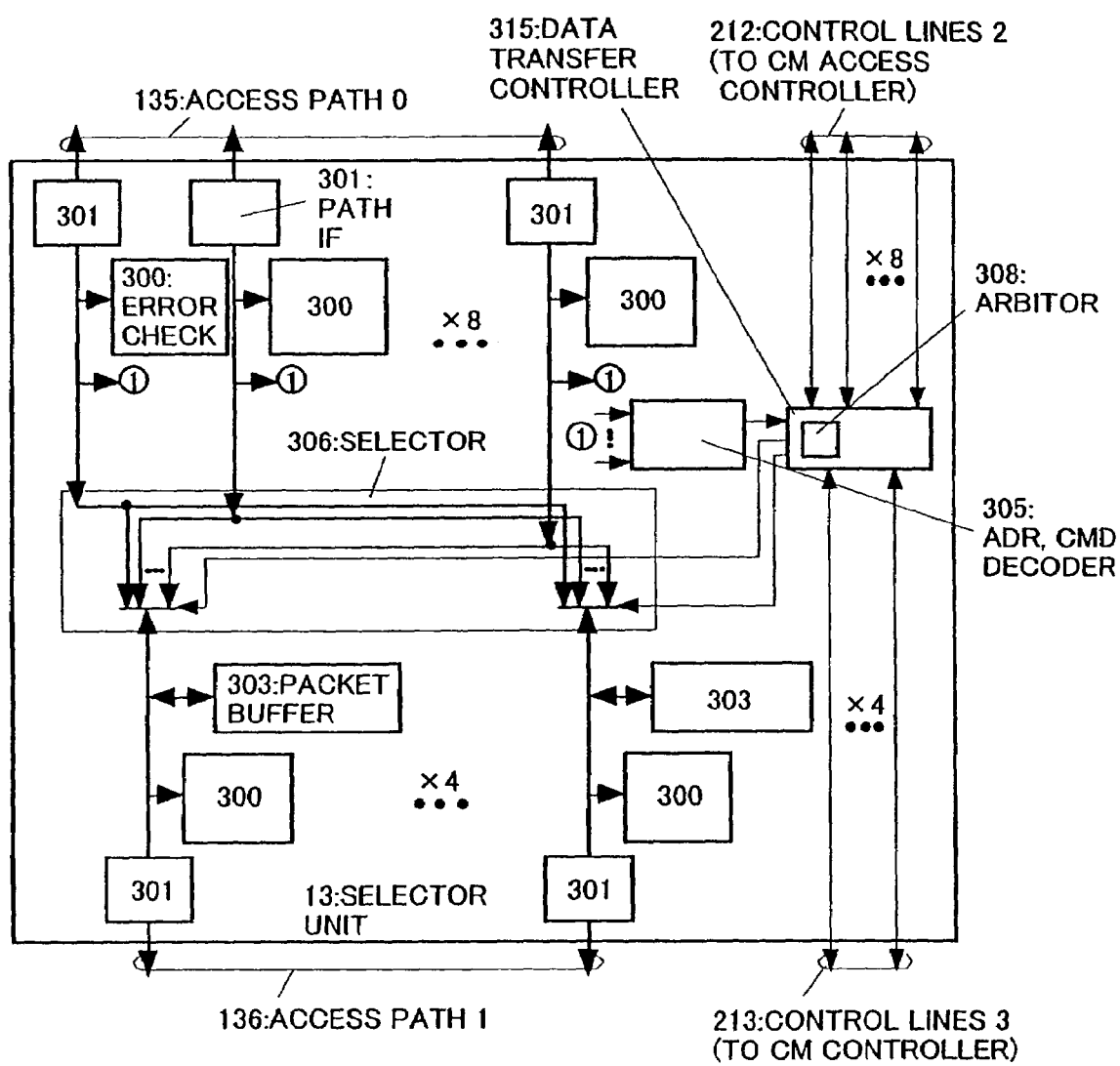
FIG. 5 is a block diagram of a selector unit provided in the disk array controller of the present invention.

FIG. 5 shows the internal configuration of the selector unit 13. The selector unit 13 has eight path IFs 301 associated with the access path 0:135 connected to the channel IF units 411 and 413 and the disk IF units 414 and 415, four path IFs 301 associated with the access paths 1:136 connected to the CM controllers 114, a selector 306 for effecting connection between path IFs 301, packet buffers 303, data error check units 300, an address/command (adr, cmd) decoder 305 for decoding an address and command as sent from the CM access control unit (s) 104, and a data transfer control unit 315. The data transfer control unit 315 is connected by control lines 2:212 to the data transfer control units 310 within the CM access control units 104 and also is connected by control lines 3:213 to the data transfer control units 315 in the CM controllers 114. The data transfer control unit 315 includes an arbiter 308 for performing arbitration of access requests from eight access paths 0:135 which were decoded by the adr, cmd Decoder 305 while performing switching of the selector 306. The packet buffers 303 operate in such a way that in cases where a difference in data transfer rate is found between the paths on the side of access paths 0:135 and those on the side of access paths 1:136, they exhibit buffering of part or all of the data being transferred in order to absorb such a rate difference.

The adr, cmd decoder 305 has buffers for storage of an address and command, an adr extractor unit, and a cmd extractor unit (not shown in the drawing). At the adr, cmd decoder 305, addresses and/or commands are stored in buffers assigned to the eight access paths 0:135 connected to the CM access control units 104 on a one-per-path basis- namely, an individual one of them is assigned to a respective one of the four access paths 0:135. At the adr extractor unit and cmd extractor unit, specify a CM controller 107 to be accessed is specified and also the type or kind of access is specified, and then the access requests are sent to the arbiter 308 within the data transfer control unit 135.

Figure 6:
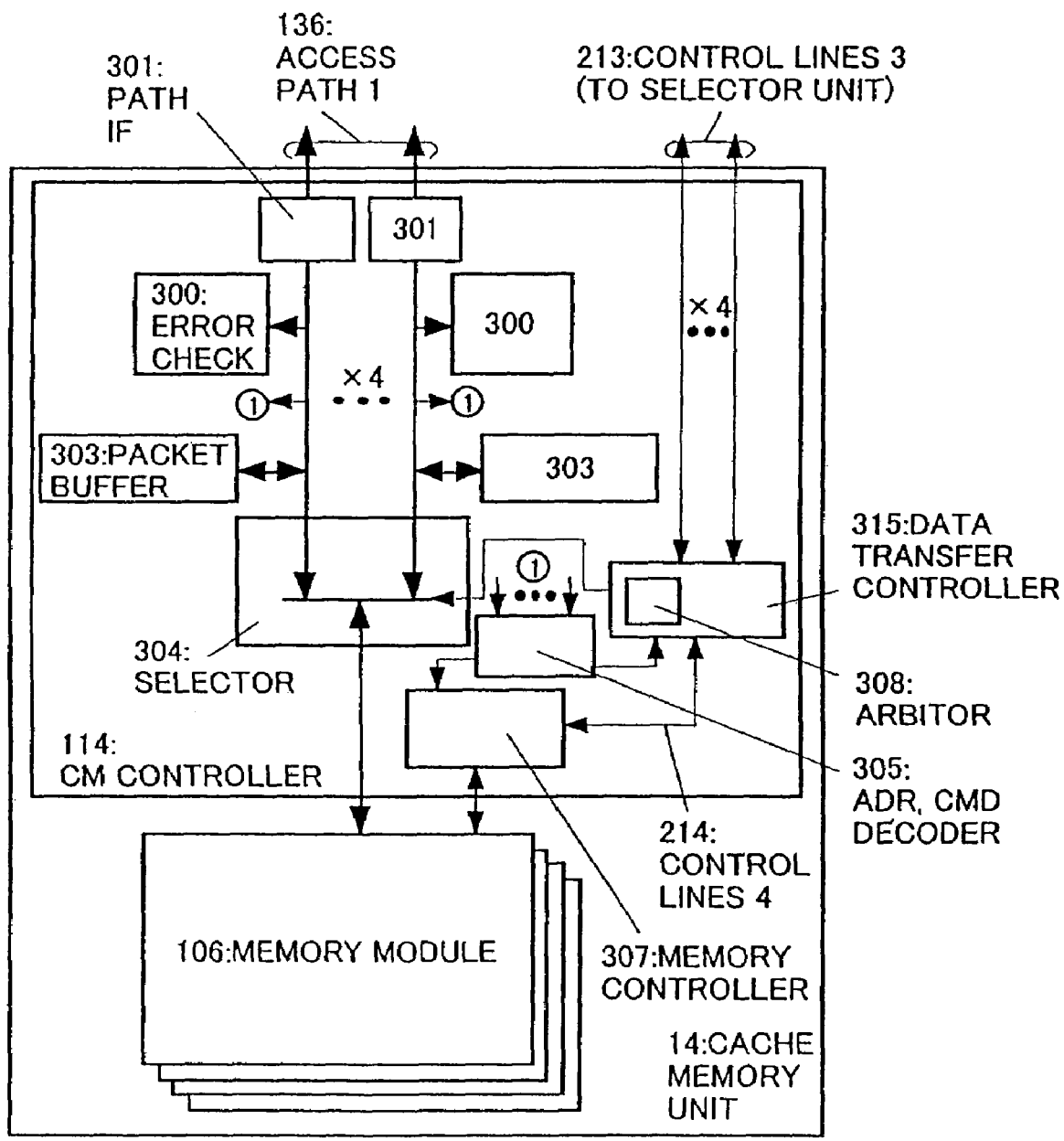
FIG. 6 is a block diagram of a cache memory unit provided in the disk array controller of the present invention.

FIG. 6 shows the internal configuration of the cache memory unit 14. The cache memory unit 14 has a CM controller 114 and a memory module 106. The CM controller 114 has four path IFs 301 associated with the access paths 1:136 connected to the selector units 13, a selector 304, packet buffers 303 for temporary data storage, data error check units 300, a memory control unit 307 for controlling access to the memory module 106, an adr, cmd decoder 305 for decoding an address and command as sent from the CM access control unit(s) 104, and a data transfer control unit 135. The data transfer control unit 315 is connected by control lines 3:213 to the data transfer control units 315 within the selector units 13. The data transfer control unit 315 uses its arbiter 308 to perform arbitration of access requests from four access paths 1:136 as has been decoded by the adr, cmd decoder 305 while performing switching of the selector 304.

The adr, cmd decoder 305 has buffers, an adr extractor unit, and a cmd extractor unit (now shown in the drawing). At the adr, cmd decoder 305, addresses and/or commands are stored in buffers that are assigned one-by-one to four access paths 1:136 connected to the CM controllers 114. At the adr extractor unit and cmd extractor units, specify the address of a memory to be accessed and the type of access for transmission toward the memory control unit 307 are specified. In addition, access requests from four access paths 1:136 are sent to the arbiter 308 within the data transfer control unit 315.

A description will next be given of the procedure at the time of obtaining access to the cache memory units 14. In the event of access to a cache memory unit or units 14, the microprocessor 101 instructs either the host IF(s) 102 or drive IF(s) 103 to begin the process for obtaining access to the cache memory unit(s) 14.

Upon receiving the instruction for start of access, either the host IF 102 or drive IF 103 transmits a signal indicative of such access start via the control line(s) 1:211 toward the data transfer control unit(s) 310 within the CM access control unit(s) 104. Simultaneously, it sends an address, command and data (only when data writing) through data line(s) 210.

The CM access control unit 104 stores in the packet buffer(s) 303 the address and command and data (only when data writing) received via the data line(s) 210. The data transfer control unit 310 performs arbitration to determine the right to use the path IF or IFs 301 for switching the selector 302.

Figure 7:
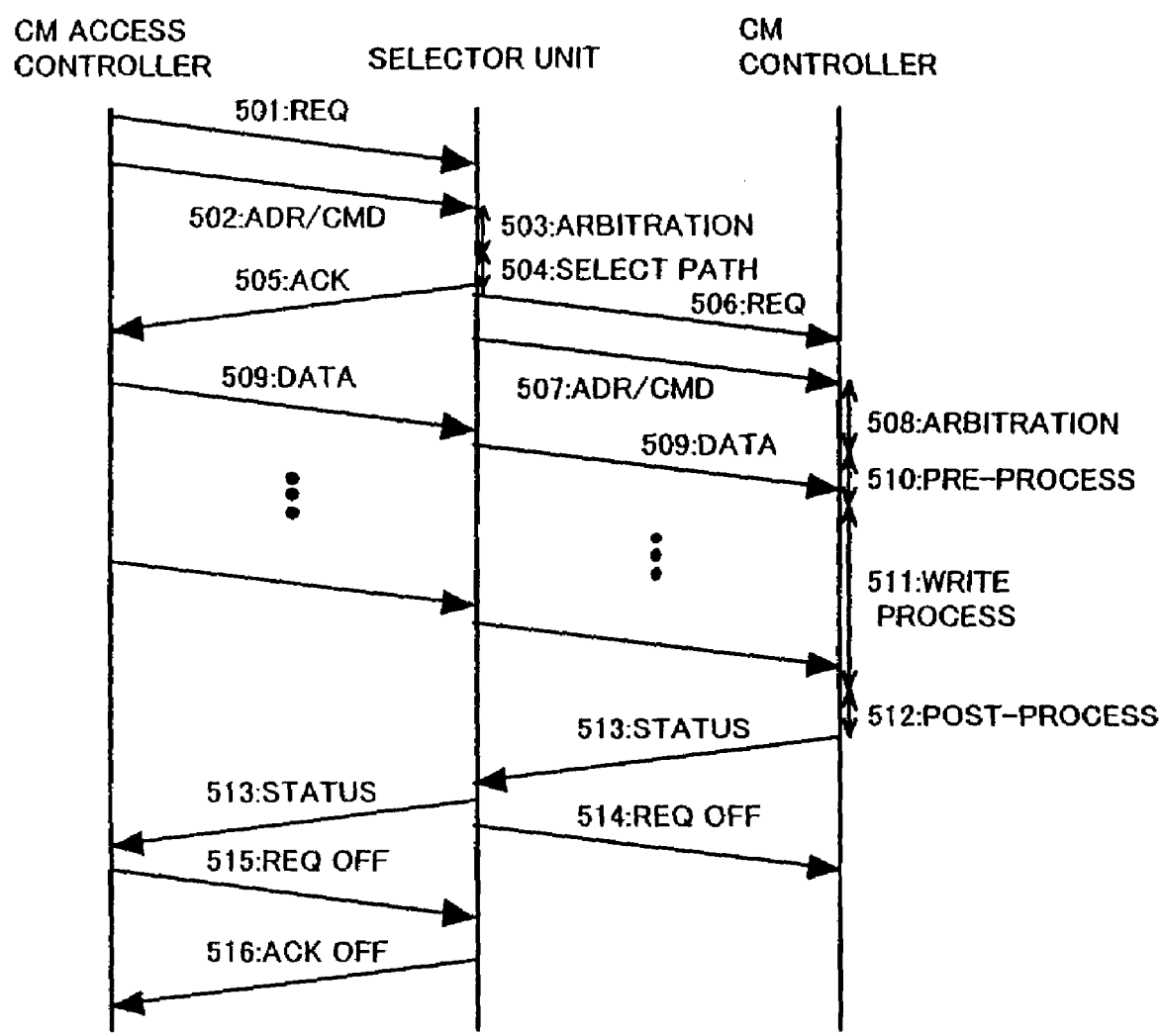
FIG. 7 is a diagram which illustrates a procedure for writing data in the cache memory unit.

FIG. 7 shows a flow of access from the CM access control unit 104 to the CM controller 114 in the event of writing data into the cache memory unit(s) 14. Upon determination of the right to use access path 0:135 by arbitration, the data transfer control unit 310 within the CM access control unit 104 generates and issues a signal (REQ) indicative of the access start toward the data transfer control unit(s) 315 within the selector unit(s) 13 via the control lines 2:212 (at step 501). Subsequently, an address and command are sent out (step 502).

Upon receipt of the REQ signal from the CM access control unit 104, the data transfer control unit 315 within the selector unit 13 next receives an address and command that will be sent through the access path(s) 0:135 to perform arbitration on the basis of an access request decoded by the adr, cmd decoder 305 (step 503). Once the arbitration results in granting of the right to connect to the access path(s) 1:136, the data transfer control unit 315 switches the selector 306 (step 504) while at the same time returning, via control line(s) 2:212 to the data transfer control unit(s) 310 within the CM access control unit(s) 104, a signal (ACK) indicative of the fact that the right of connection to the access path(s) 1:136 has been obtained (step 505). Next, the data transfer control unit 315, outputs via control lines 3:213 to the data transfer control unit(s) 315 within the CM controller(s) 104, a signal (REQ) indicating the start of access (step 506). Subsequently, an address and command are sent (step 507).

When receiving the ACK signal, the CM access control unit 104 reads data out of the packet buffer(s) 303 for transmission to the access path(s) 0:135 through the selector 302 and path IF(s) 301. The selector unit or units 13 send data transmitted via the access path(s) 0:135 to the access path(s) 1:136 through the path(s) IF 301 and selector 306 (step 509).

Upon receiving of the REQ signal via the control line(s) 3:213, the data transfer control unit 315 within the CM controller 114 next receives an address and command that will be sent through the access path(s) 1:136 to perform arbitration on the basis of the access request that has been decoded, by the adr, cmd decoder 305 (at step 508), thereby switching the selector 304. The data sent via the access path(s) 1:136 is stored in the packet buffer(s) 303. If the arbitration results in granting of the right to give access to the memory module 106, then memory control information is sent to the memory control unit 307 to initiate preprocessing for memory access (step 510). Next, data is read from the packet buffer(s) 303 for writing into the memory module 106 via the selector 304 (step 511).

After having completed access to the memory module 106, post-processing of such memory access is initiated and the data transfer control unit 315 will generate a status (STATUS) indicative of an access situation (step 512). Next, the status is transmitted to the CM access control unit(s) 104 through the selector unit(s) 13 (step 513). Upon receipt of the status, the data transfer control unit(s) 315 within the selector unit(s) 13 turns off the REQ signal to the CM controller(s) 114 (step 514). Upon receiving the status, the data transfer control unit(s) 310 within the CM access control unit(s) 104 turns off the REQ signal to the selector unit(s) 13 (step 515). When having affirmed turn-off of the REQ signal from the CM access control unit(s) 104, the data transfer control unit(s) 315 within the selector unit(s) 13 turns off the ACK signal being sent to the CM access control unit(s) 104 (step 516).

Upon receipt of the status, the data transfer control unit 310 within the CM access control unit 104 notifies either the host IFs 102 or drive IFs 103 of termination of access to the cache memory unit(s) 14 via control line(s) 1:211.

A flow of access from the CM access control unit(s) 104 to the CM controller(s) 114 in the event of reading data out of the cache memory unit(s) 14 is the same as that in the case of data writing as far as the steps 501 to 508 and those following the step 512 are concerned.

Here, upon receiving of the ACK signal at step 505, the CM access control unit 104 enters the data receipt wait state.

When having obtained the memory access right at step 508, the CM controller 105 reads data from the memory module 106 for transmission to the access path(s) 1:136 through the selectors 304 and path IF(s) 301.

Upon receipt of data via the access path(s) 1:136, the selector unit or units 13 send data to the access path(s) 0:135 through the path IF(s) 301 and selector 306.

Upon receiving data via the access path(s) 0:135, the CM access control unit 104 transmits data through the selector 302 and data line 210 toward either the host IFs 102 or the drive IFs 103.

Next, accessing the shared memory unit 15 from each of the channel IF units for mainframe 411, the channel IF units for FC 413, the disk IF units for SCSI 414, and the disk IF units for FC 415 and the SM controller 115 will be described.

Figure 8:
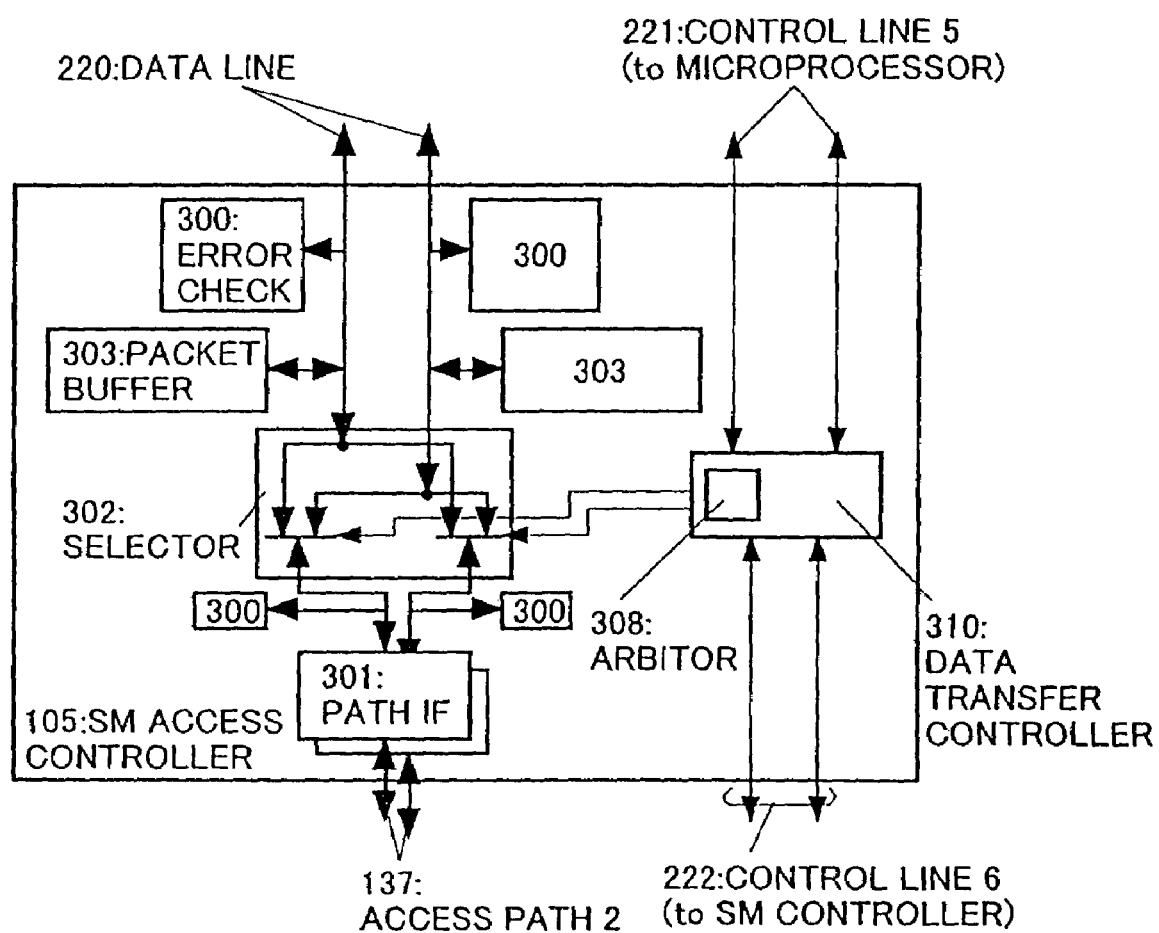
FIG. 8 is a block diagram of an SM access controller provided in the disk array controller of the present invention.

FIG. 8 shows the internal configuration of the SM access control unit 105. The SM access control unit 105 has a selector 302, packet buffers 303 for temporarily storing therein an address and command along with data, a path IF 301 associated with access paths 2:137 connected to the SM controllers 115, data error check units 300, and a data transfer control unit 310. Two ports of the selector 302 are connected by data lines 220 to the microprocessors 101. The other two ports of the selector 302 are connected to the path IF 301. The path IF 301 is connected by access paths 2:137 to the SM controllers 115. The data transfer control unit 310 is connected by control lines 5:221 to the microprocessors 101 and is also connected by control lines 6:222 to the data transfer control units 315 within the SM controllers 115. The data transfer control unit 310 uses its arbiter 308 to perform arbitration of access requests from the microprocessors 101 for switching of the selector 302.

Figure 9:
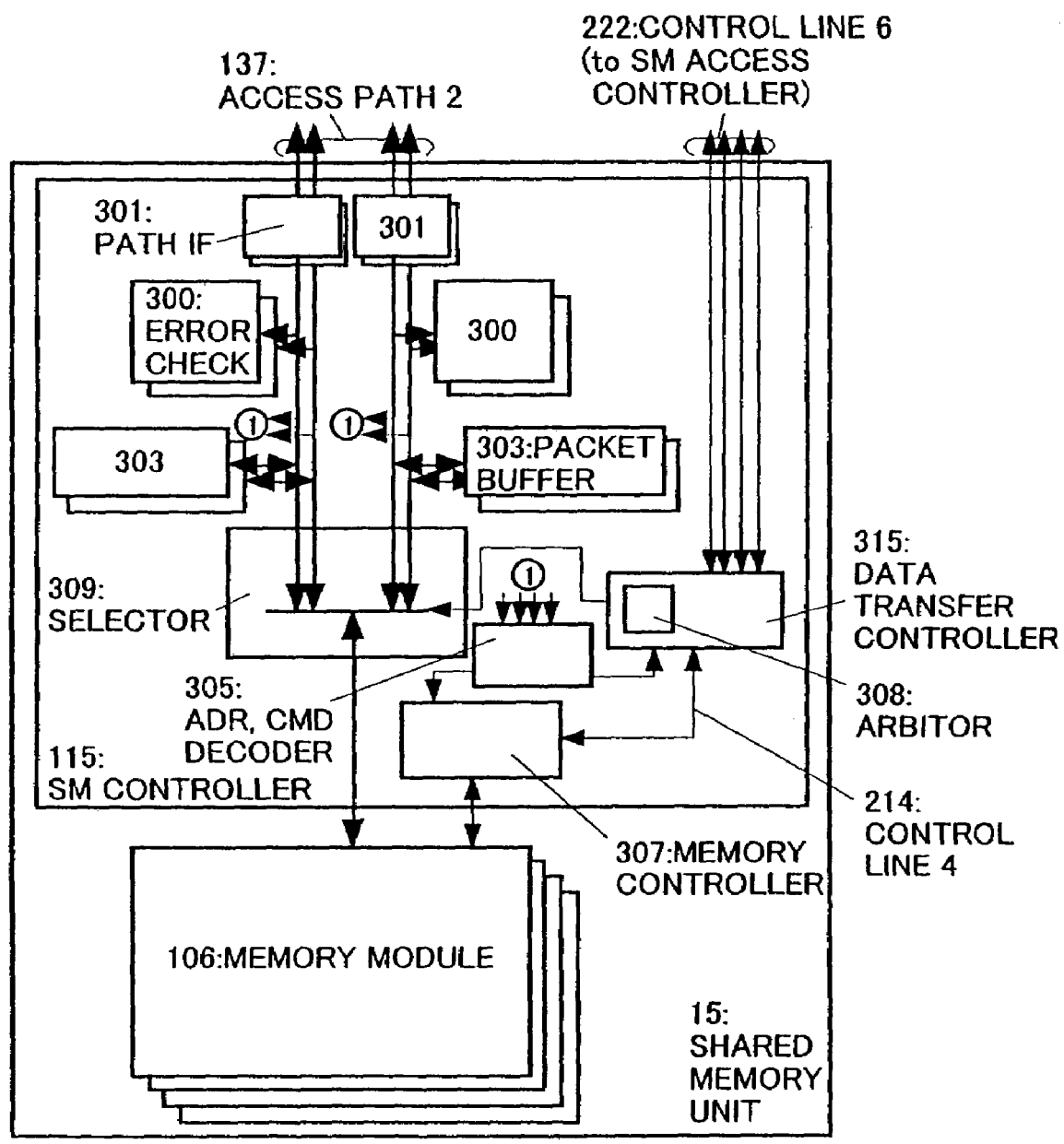
FIG. 9 is a block diagram of a shared memory unit provided in the disk array controller of the present invention.

FIG. 9 shows the arrangement inside of the shared memory unit 15. The shared memory unit 15 has its SM controller 115 and memory module 106. The SM controller 115 has eight path IFs 301 associated with the access paths 2:137 connected to the SM access control units 105, a selector 309, packet buffers 303 for temporary data storage, data error check units 300, a memory control unit 307 for controlling access to the memory module 106, an "adr, cmd" decoder 305 for decoding an address and command sent from the SM access control unit(s) 115, and a data transfer control unit 315. The data transfer control unit 315 is connected by control lines 6:222 to the data transfer control units 310 within the SM access control units 105. The data transfer control unit 315 uses its arbiter 308 to perform arbitration of access requests from eight access paths 2:137 decoded by the adr, cmd decoder 305 for switching of the selector 309.

The adr, cmd decoder 305 has buffers, an adr extractor unit, and a cmd extractor unit (not shown). At the adr, cmd decoder 305, an address and command are stored in certain buffers assigned to eight access paths 2:137 connected to the SM controller 115 respectively on a one-to-one basis. At the adr extractor unit and cmd extractor unit, the address of a memory to be accessed along with the type of access for transmission toward the memory is control unit 307 are specified. In addition, access requests are sent from eight access paths 2:137 to the arbiter 308 within the data transfer control unit 315.

Next, there will be described a procedure at the time of obtaining access to the shared memory units 15. In the case of obtaining access to the shared memory units 15, the microprocessor 101 sends forth a signal representative of access start through the control lines 5:221 to the data transfer control unit(s) 310 within the SM access control unit(s) 105. Simultaneously, an address and command are sent along with data (only when data writing) via data lines 220.

The SM access control unit 105 stores in the packet buffer(s) 303 the address and command and data (only when data writing) received via the data lines 220. The data transfer control unit 310 performs arbitration to determine the right to use the path IFs 301 for switching the selector 302.

Figure 10:
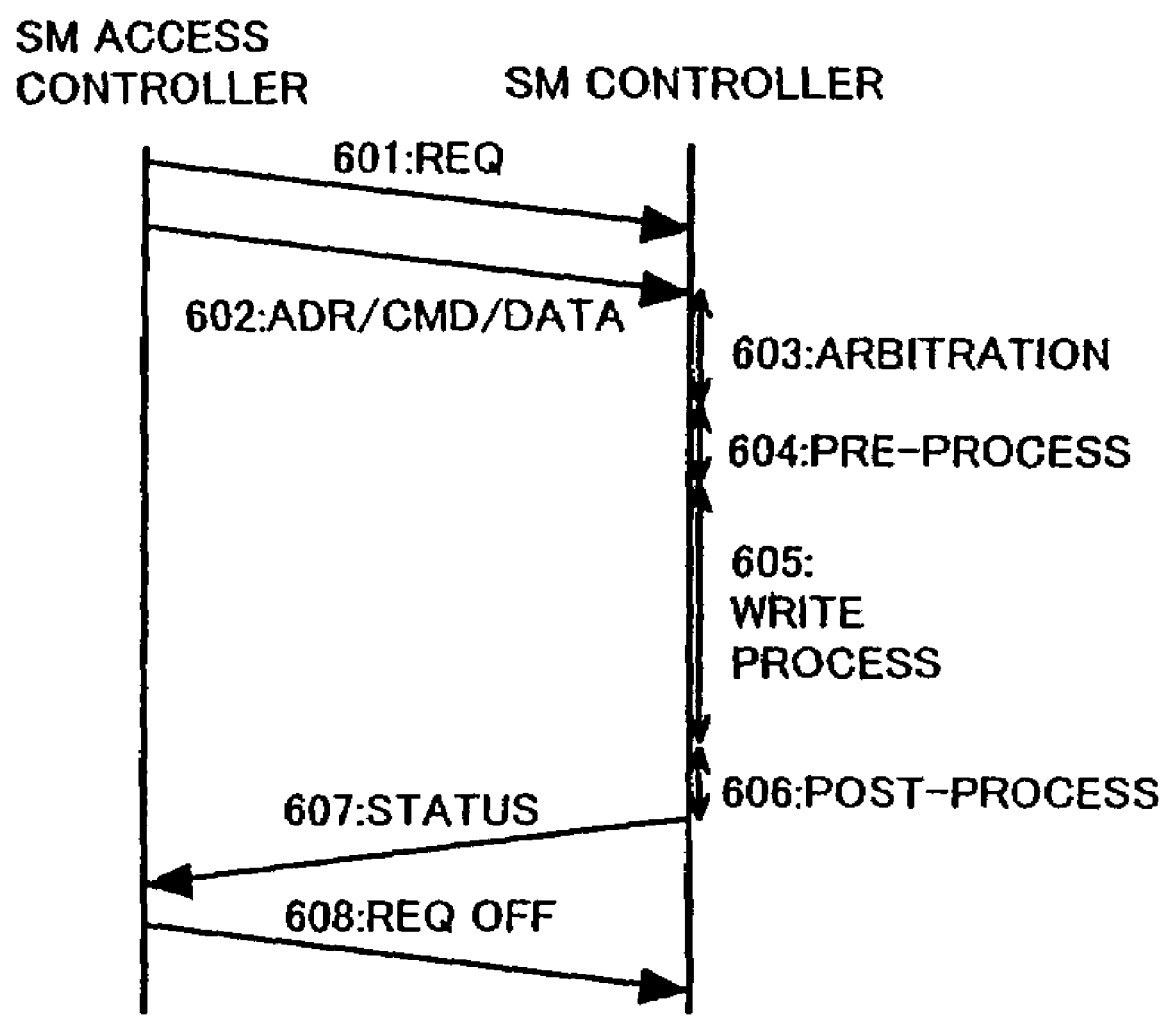
FIG. 10 is a diagram which illustrates a procedure for writing data in the shared memory unit.

FIG. 10 shows a flow of access from the SM access control unit 105 to the SM controller 115 in the case of writing data into the shared memory unit(s) 15. Upon determination of the right to use access paths 2:137 by such arbitration, the data transfer control unit 310 within the SM access control unit 105 issues a signal (REQ) indicative of access start to the SM controller 115 via control lines 6:222 (step 601). Then, an address and command are continuously sent along with data (step 602).

Upon receipt of the REQ signal via control line 6:222, the data transfer control unit 315 within the SM controller 115 next receives an address and command and data sent via the access paths 2:137. The adr, cmd decoder 305 decode the address and command; arbitration is performed on the basis of an access request (step 603) for switching the selector 309. Data is stored in the packet buffer(s) 303. If the arbitration results in the granting of the access right to the memory module 109, then memory control information is sent to the memory control unit 307 to thereby perform a preprocessing for memory access (step 604). Next, data is read out of the packet buffer(s) 303 and written into the memory module 109 via the selector 309 (step 605).

After having completed an attempt to gain access to the memory module 106, a post-processing of memory access is performed to thereby generate at the data transfer control unit 315 a status (STATUS) indicative of the access situation (step 606). Next, the status is sent to the SM access control unit 105 (step 607). Upon receipt of the status, the data transfer control unit 310 within the SM access control unit 105 turns off the REQ signal sent to the SM controller 115 (step 608).

Upon receiving the status, the data transfer control unit 310 within the SM access control unit 105 notifies via control lines 5:221 the microprocessors 101 of termination of access to the shared memory units 15.

A flow of access from the SM access control unit 105 to the SM controller 115 in the case of reading data from the shared memory unit(s) 15 is the same as that in the case of data writing with respect to the steps 601 to 604 and the step 606 et seq.

After having performed the preprocessing of memory access of step 604, the SM controller 115 reads data out of the memory module 106 for transmission to the access paths 2:137 via the selector 309 and path IF(s) 301.

When receiving data via the access paths 2:137 the SM access control unit 105 sends data to the microprocessors 101 via the selector 302 and data lines 220.

Next, other features of this embodiment will be described.

If the bandwidth differs among the selector units 13, it causes a problem in that the data transfer throughput of each of the channel IF units for mainframe 411, the channel IF units for FC 413, the disk IF units for SCSI 414, or the disk IF units for FC 415 connected to a selector unit of a low bandwidth is degraded more than that of those units 411, 413, 414, or 415 connected to a selector unit which has a wide bandwidth. In such a case, a performance difference is generated between the two channel IF units for mainframe 411, between the two channel IF units for FC 413, between the two disk IF units for SCSI 414, and between the two disk IF units for FC 415, whereby the data transfer performance of the whole disk array controller 1 loses its balance.

In order to avoid such a problem in this embodiment, the bandwidth is almost equalized among the selector units 13. More concretely, an access path 0:135 is used to connect each selector unit 13 to each of the channel IF units for mainframe 411, the channel IF units for FC 413, the disk IF units for SCSI 414, and the disk IF units for FC 415, and two access paths 1:136 are used to connect each of those units to the cache memory unit 14. In other words, this embodiment is characterized by the fact that the combination of the type and the number of channel IF units is the same as the combination of the type and the number of disk IF units. A type of channel IF unit means a type classified by the type of the interface with the host computer, and two types (channel IF units for mainframe 411 and the channel IF units for FC 413) are used in this embodiment; and, a type of disk IF unit means a type classified by the type of the interface with the magnetic disk unit, and two types of disk IF unit (disk IF units for SCSI 414 and the disk IF units for FC 415) are used in this embodiment. In this embodiment, the bandwidth per line is also assumed to be completely the same among the access paths 0:135 and the access paths 1:136 (for example, 200 MB/sec). Consequently, the bandwidth can be equalized among selector units 13. In addition, for example, if the bandwidth is set differently among access paths 0:135 after the bandwidth of the access path 0:135 connected to the channel IF units for mainframe 411 is set to 100 MB/sec and the bandwidth of the access path 0:135 connected to each channel IF unit for FC 413 is set to 200 MB/sec, then the disk array controller composed like in this embodiment will enable the bandwidth to be equalized among the selector units 13. It is thus possible to unify the performance between channel IF units of the same type or between disk IF units of the same type.

According to this embodiment, if the access frequency from each host computer is almost the same, the access frequency to each selector unit 13 will also be almost the same. In other words, the usage rate of each selector unit 13 is almost equal to that of the others. Consequently, a difference is hardly generated in throughput between the two channel IF units for mainframe 411, between the two channel IF units for FC 413, the two disk IF units for SCSI 414, or the two disk IF units for FC 415. The data transfer throughput can thus be well balanced in the whole disk array controller 1, whereby this embodiment can provide a disk array controller with a high data transfer throughput. As for the channel IF unit types described in this embodiment, SCSI channels, metal channels, etc. may also be employable.

Next, some variations of this embodiment will be described. In those variations, only the different points from the above embodiment 1 will be described. The description of the shared memory unit is omitted in those variations.

[Variation 1]

Figure 11:
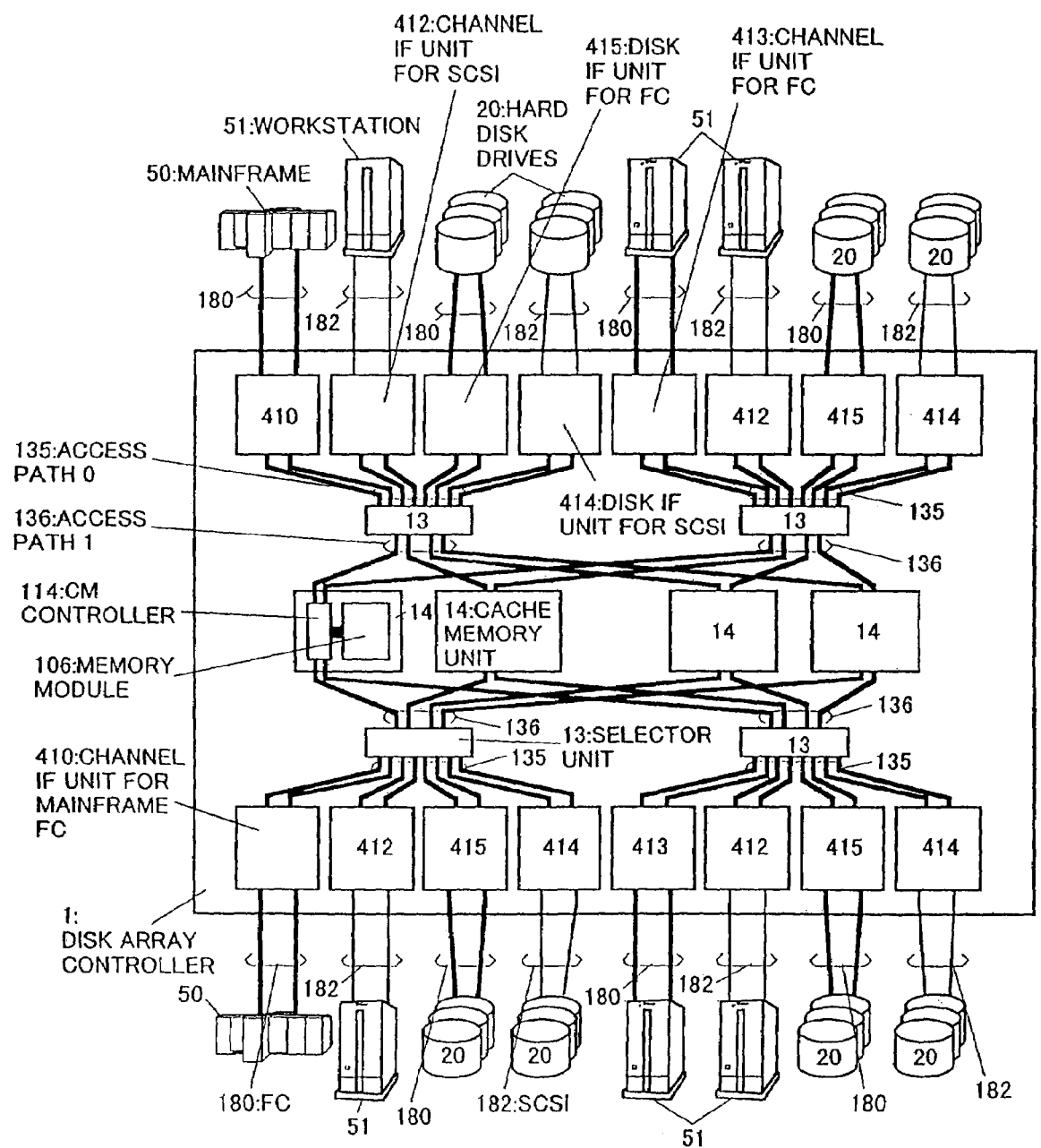
FIG. 11 is a block diagram of the disk array controller of the present invention.

In the disk array controller 1 shown in FIG. 11, each of the two selector units 13 on the left side is connected to eight access paths 0:135, including two from one channel IF unit for mainframe FC 410, two from one channel IF unit for SCSI 412, two from one disk IF unit for SCSI 414, and two from one disk IF unit for FC 415. Each of the two selector units 13 on the right side are connected to eight access paths 0:135, including two from one channel IF unit for SCSI 412, two from one channel IF unit for FC 413, two from one disk IF unit for SCSI 414, and two from one disk IF unit for FC 415. In addition, each selector unit 13 is connected to an access path 1:136 to each of the four cache memory units 14 (four access paths in total).

Each selector unit 13 has a function of selecting and executing only two access requests if access requests from the channel IF units for mainframe 411 and for FC 413, as well as disk IF units for SCSI 414 and for FC 415, the channel IF units 11, or the disk IF units 12 are more than two, which is equal to the number of access paths 1:136 to the cache memory units 14.

Even in this variation 2, use of the selector units 13 has successfully solved the problem of bottlenecks in the LSI pins of the cache memory unit and the connector of the LSI package.

Furthermore, each of the selector units 13 is connected to channel IF units and disk IF units connected to fiber optic channels 180 and channel IF units and disk IF units connected to SCSI channels 182, and the type and the number of channel IF units 11. The type and the number of disk IF units connected to a selector unit 13 respectively are set equally among the selector units 13 and the same bandwidth is used among them. Consequently, the data transfer throughput can be well balanced in the whole disk array controller 1 as described above, whereby this variation can provide a disk array controller with a high data transfer throughput.

[Variation 2]

Figure 12:
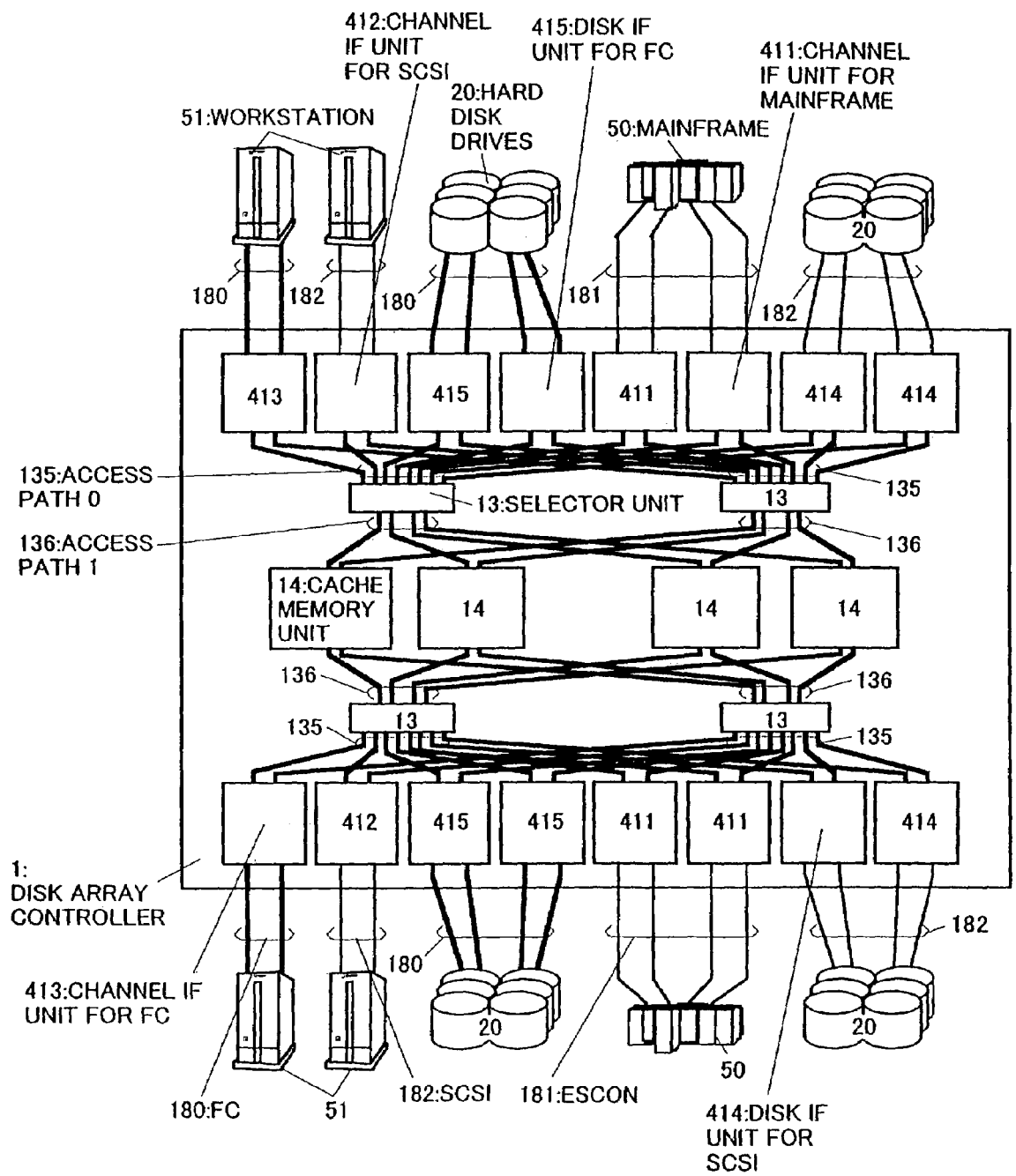
FIG. 12 is a block diagram of the disk array controller of the present invention.

Even in the disk array controller 1 shown in FIG. 12, each selector unit 13 is connected to two channel IF units for mainframe 411, one channel IF unit for SCSI 412, one channel IF unit for FC 413, two disk IF units for SCSI 414, and two disk IF units for FC 415. The type and the number of channel IF units is set equally to the type and the number of disk IF units connected to a selector unit respectively, and the same bandwidth is also used for them.

In this variation 2, two access paths 0:135 are connected to each of two channel IF units for mainframe 411, one channel IF unit for SCSI 412, one channel IF unit for FC 413, two disk IF units for SCSI 414, and two disk IF units for FC 415 and those two access paths 0:135 are connected to two different selector units 13. Consequently, two access routes can be secured from one channel IF unit or one disk IF unit to one cache memory unit 14. Therefore, if an error is detected in one access path 0:135, one access path 1:136, or one selector unit 13, the other access route makes it possible to is access the cache memory unit 14. The error resistance of the disk array controller can thus be further improved.

[Variation 3]

Figure 13:
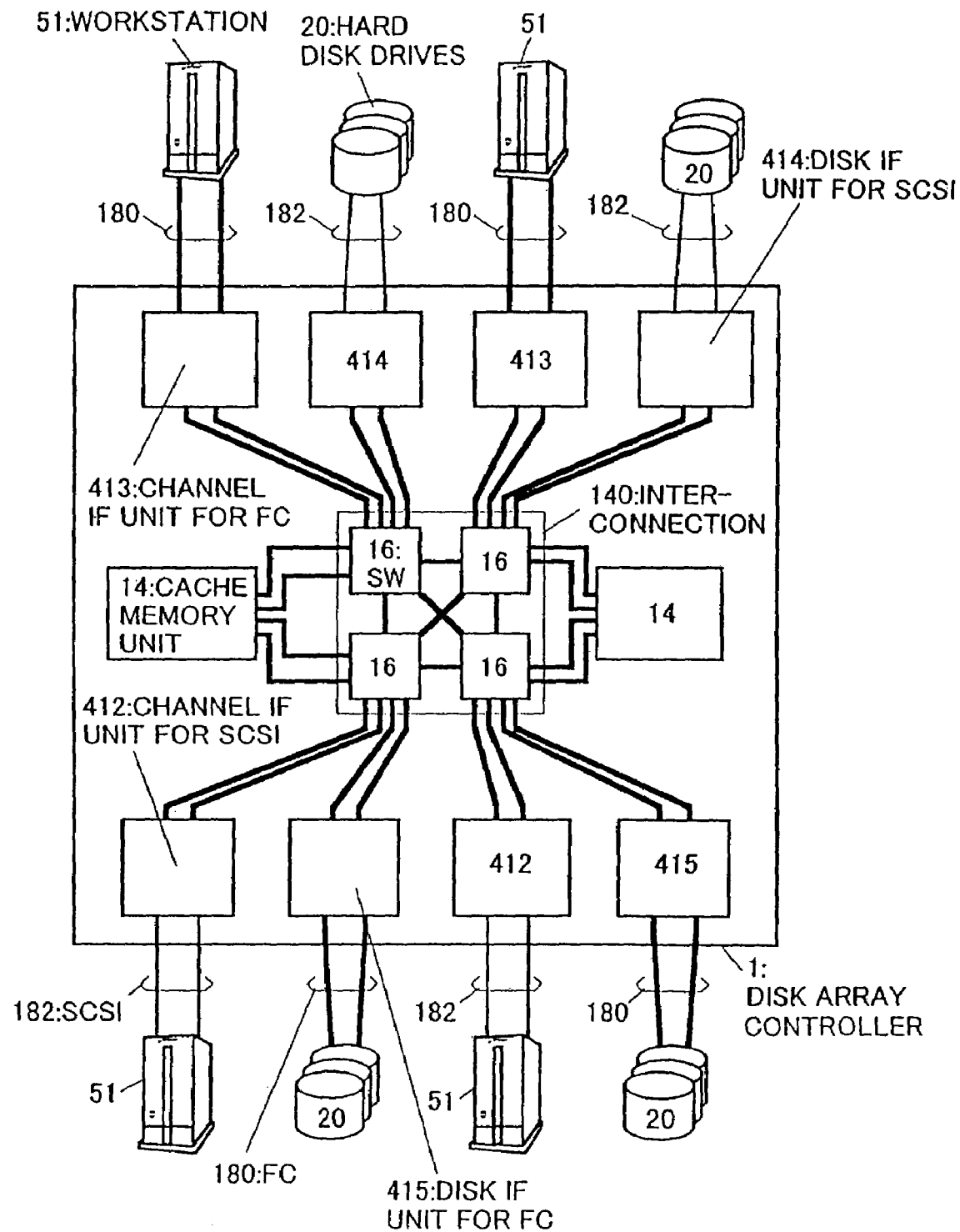
FIG. 13 is a block diagram of the disk array controller of the present invention.

In the disk array controller 1 shown in FIG. 13, a cache memory unit 14 is connected to each of the channel IF units for SCSI 412, the channel IF units for FC 413 the disk IF units for SCSI 414, and the disk IF units for FC 415 with use of an inter-connection 140 composed of a plurality of switches (SW) 16. Also in this case, the bandwidth is set equally among those switches, whereby the data transfer throughput can be well balanced in the whole disk array controller 1.

[Variation 4]

Figure 14:
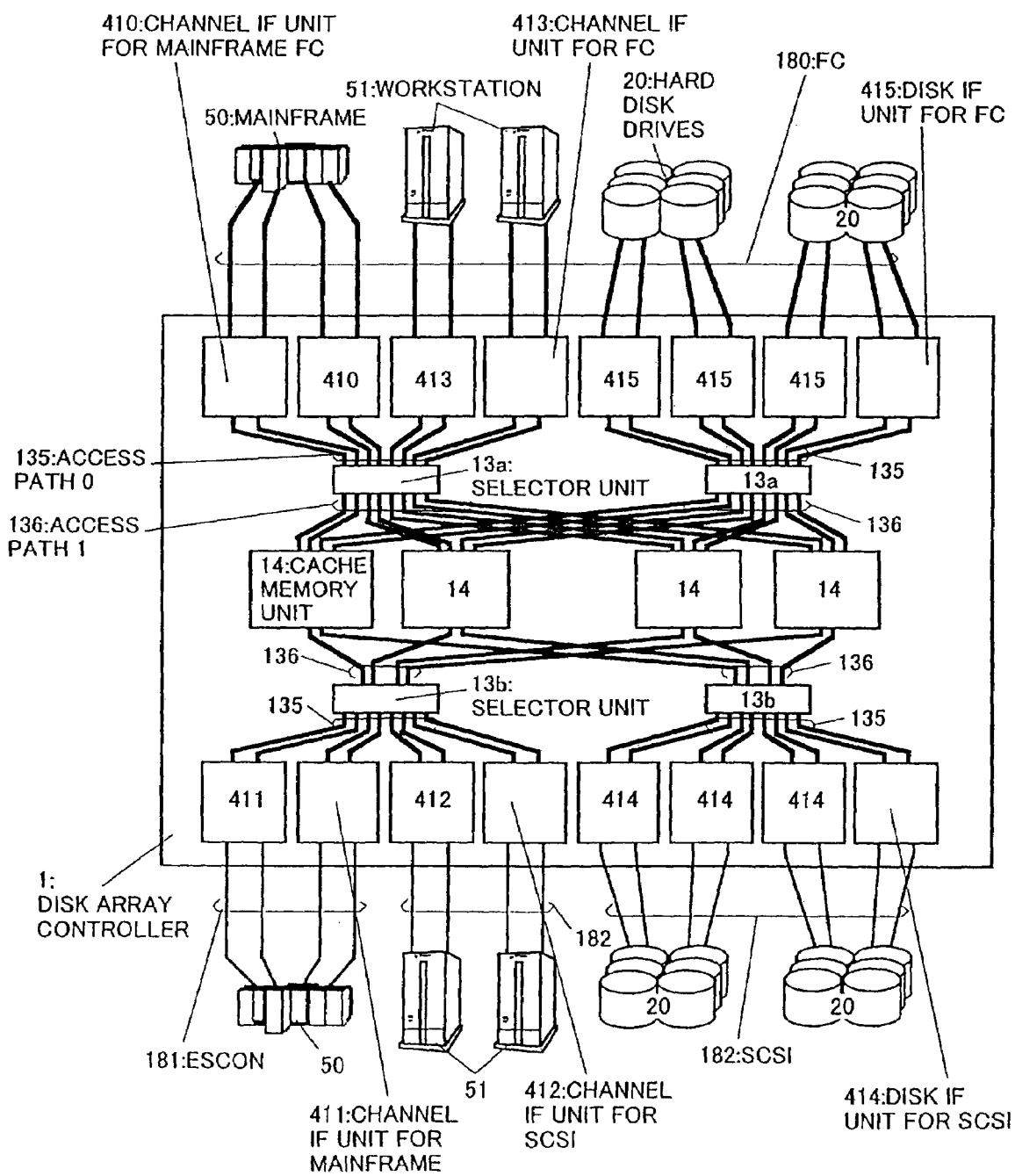
FIG. 14 is a block diagram of the disk array controller of the present invention.

In the disk array controller 1 shown in FIG. 14, each of the channel IF units for FC 410, the channel IF units for FC 413, and the disk IF units for FC 415 connected to a host computer or a magnetic disk unit through a wide bandwidth fiber optic channel, respectively, is connected to a selector unit 13a, while each of the channel IF units for mainframe 411, the channel IF units for SCSI 412, and the disk IF units for SCSI 414 connected to a host computer or a magnetic disk unit with use of a narrow bandwidth SCON channel 181 or a SCSI channel 182, respectively, is connected to a selector unit 13b.

Eight access paths 1:136 are connected to each selector unit 13a and those eight access paths 1:136 are connected to four cache memory units 14, two to each unit. Four access paths 1:136 are connected to each selector unit 13b and those access paths 1:136 are also connected to four cache memory units 14, one to each unit. The bandwidth of those access paths 0:135 and 1:136 is assumed to be 200 MB/sec per line, so the bandwidth of the selector units 13a is wider than that of the selector units 13b.

Because selector units are divided into those connected to wide bandwidth channel IF units from the host computers and wide bandwidth disk IF units from the magnetic disk units 20 and those connected to narrow bandwidth channel IF units from the host computers and narrow bandwidth disk IF units from the magnetic disk units in such a way, and the bandwidth of each selector unit is set so as to be adjusted to the bandwidth of the channel and disk IF units connected thereto, the data transfer throughput can be well balanced in the whole disk array controller 1. In addition, the configuration of the disk array controller 1 can also prevent the data transfer throughput from degradation to be caused by a bottleneck in the bandwidth of some of the selector units.

Selector units connected to channel IF units may be separated from selector units connected to disk IF units.

[Variation 5]

Figure 15:
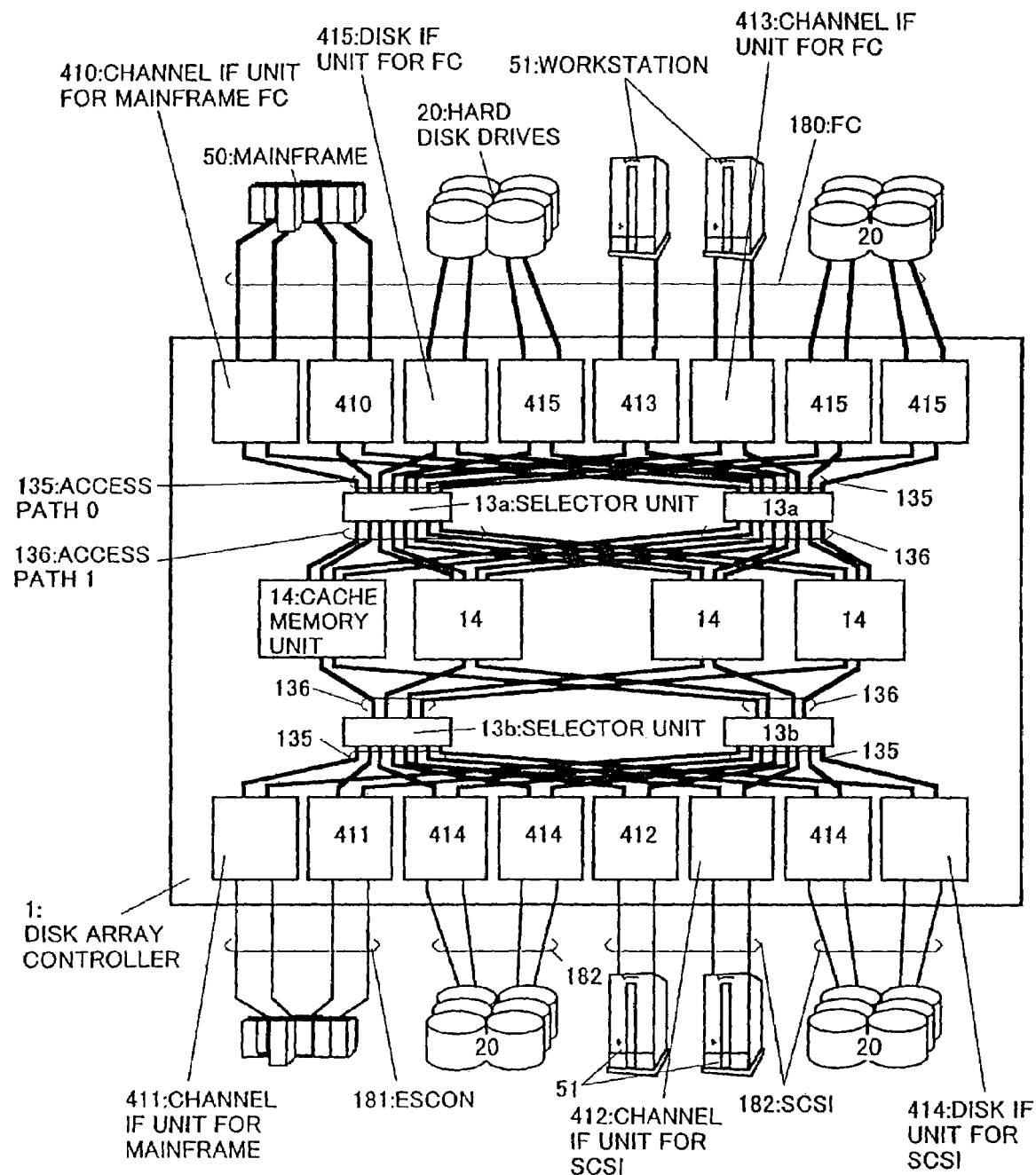
FIG. 15 is a block diagram of the disk array controller of the present invention.

Just like in the variation 4, even in the disk array controllers shown in FIG. 15, the bandwidth of the channel between each of the selector units 13a connected to wide bandwidth channel IF units from the host computers and wide bandwidth disk IF units from the magnetic disk units 20 and a cache memory unit 14 is set wider than that of each of the selector units 13b connected to narrow bandwidth channel IF units from the host computers and narrow bandwidth disk IF units from the magnetic disks and a cache memory unit 14.

In this variation 5, two access paths 0:135 are connected to each of the channel IF units 410 for mainframe FC 410, the channel IF units for FC 413, and the disk IF units for FC 415. Those two access paths 0:135 are also connected to two different selector units 13a, one to each unit. And, two access paths 0:135 are connected to each of the channel IF units for mainframe 411, the channel IF units for SCSI 412, and the disk IF units for SCSI 414. Those two access paths 0:135 are also connected to two different selector units 13b, one to each unit. Consequently, two access routes can be secured from one channel IF unit or disk IF unit to one cache memory unit. As a result, even when an error occurs in one access path 0:135, one access path 1:136, or one selector unit 13, the other access route can assure the access to the cache memory unit 14. The error resistance of the disk array controller 1 can thus be improved even more.

[Variation 6]

Figure 16:
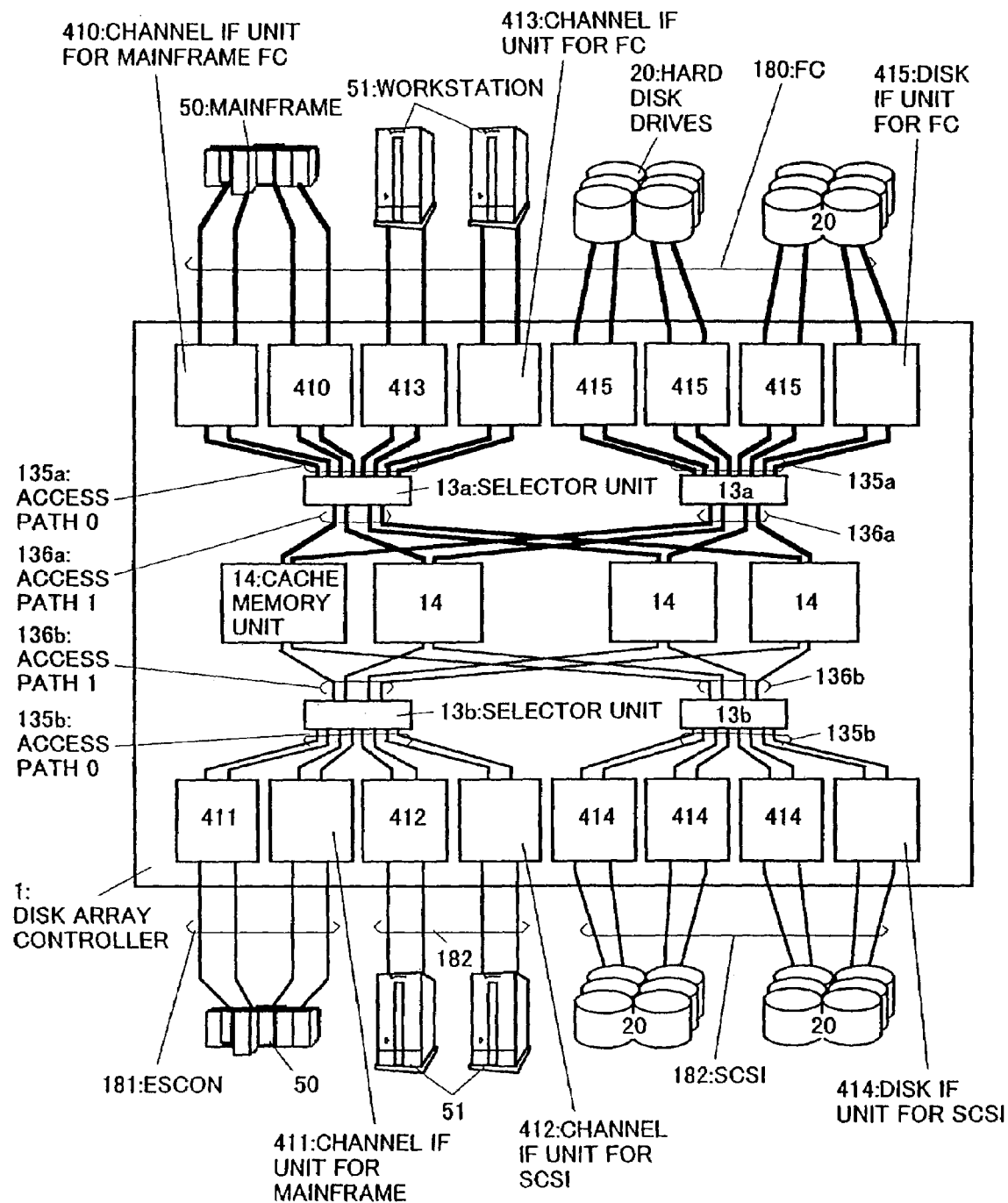
FIG. 16 is a block diagram of the disk array controller of the present invention.

Just like in the variation 4, in the disk array controller 1 shown in FIG. 16, each selector unit connected to wide bandwidth channel IF units from the host computers and wide bandwidth disk IF units from the magnetic disk units 20 is separated from each selector unit connected to narrow bandwidth channel IF units from the host computers and narrow bandwidth disk IF units from the magnetic disk units.

In this embodiment 6, the per-line bandwidth for the access paths 0:135b and 1:136b connected to the selector unit 13b is set narrower than that of the access paths 1:135 and 1:136 connected to the selector units 13a. For example, if the bandwidth of the access paths 0:135b and 1:136b connected to the selector units 13a is assumed to be 200 MB/sec per line just like in the above embodiment (for example, access path width: 2B and frequency: 100 MHz), then the bandwidth of the access paths 0:135 and 1:136 is set to 100 MB/sec per line (for example, access path width: 1B, frequency: 100 MHz or access path width: 2B, frequency 50 MHz). Consequently, the bandwidth of the channel between a selector 13a and a channel IF unit/disk IF unit, as well as between a selector unit 13a and a cache memory unit 14 are set wider than that of the channel between a selector unit 13b and a channel IF unit or a disk IF unit, as well as between a selector unit 13b and a cache memory unit 14.

Because selector units are divided into those units 13a connected to wide bandwidth channel IF units from the host computers and wide bandwidth disk IF units from the magnetic disk units 20 and those units 13b connected to narrow bandwidth channel IF units from the host computers and narrow bandwidth disk IF units from the magnetic disk units such way, the bandwidth of each selector unit is set so as to be adjusted to the bandwidth of channel and disk IF units connected thereto, the data transfer throughput can be balanced well in the whole disk array controller 1. In addition, the configuration of the disk array controller 1 can also prevent the data transfer throughput from degradation to be caused by a bottleneck in the bandwidth of some of the selector units.

[Variation 7]

Figure 17:
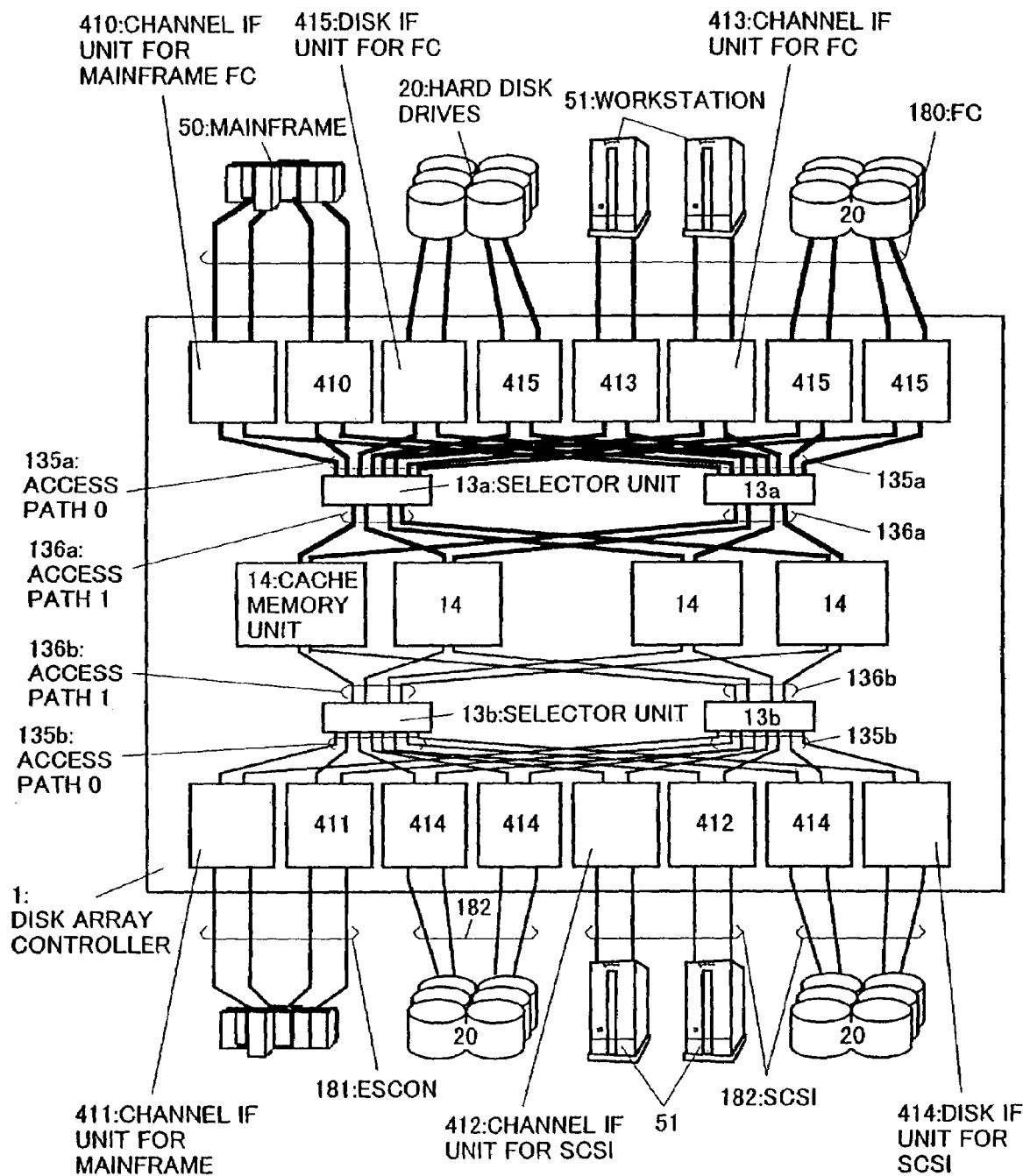
FIG. 17 is a block diagram of the disk array controller of the present invention.

Just like in the variation 6, even in the disk array controller shown in FIG. 17, the per-line bandwidth for the access paths 0:135b and 1:136b connected to the selector unit 13b is set narrower than that of the access paths 1:135b and 1:136b connected to the selector units 13a.

Furthermore, in this variation, two access paths 0:135 are connected to each of the channel IF units for mainframe FC 410, channel IF units for FC 413, and disk IF units for FC 415, respectively. Those two access paths 0:135 are also connected to two different selector units 13a, one to each selector unit. And, two access paths 0:135 are also connected to each of the channel IF units for mainframe 411, the channel IF units for SCSI 412, and disk IF units for SCSI 414, respectively. Those two access paths 0:135 are connected to two different selector units 13b, one to each selector unit. Consequently, two access routes are secured from one channel IF unit or one disk IF unit to one cache memory unit 14. Therefore, if an error occurs in one access path 0:135, one access path 1:136, or one selector unit 13, the other access route can assure the access to cache memory 14. The error resistance of the disk array controller 1 can thus be improved even more.

According to the present invention, therefore, it is possible to prevent the limitation of the data transfer throughput of the whole disk array controller to be caused by a bottleneck in a selector unit 13 and in the bandwidth of each access path connected to the selector unit 13.

What is claimed is:

1. A storage system comprising:

a first channel interface connected to a first host computer;

a second channel interface connected to a second host computer;

a first disk interface connected to a first disk device;

a second disk interface connected to a second disk device;

a plurality of cache memories configured to store data accessed to said first and second disk devices temporarily; and a plurality of selectors connected to said first and second channel interfaces and said first and second disk interfaces and said plurality of cache memories, wherein an amount of bandwidth of access paths connected to one of said plurality of selectors is equal to an amount of bandwidth of access paths connected to another one of said plurality of selectors.

2. The storage system according to claim 1, wherein said first and second channel interfaces and said first and second disk interfaces are each connected to two access paths, and said two access paths are connected to two different selectors.

3. A storage system comprising:

a first channel interface connected to a first host computer;

a second channel interface connected to a second host computer;

a first disk interface connected to a first disk device;

a second disk interface connected to a second disk device;

a plurality of cache memories configured to store data accessed to said first and second disk devices temporarily;

an interconnection which connects said first and second channel interface and said first and second disk interfaces and said plurality of cache memories;

wherein said interconnection is composed of a plurality of switches connected to each other, and an amount of bandwidth of access paths connected to one of said plurality of switches is equal to an amount of bandwidth of access paths connected to another one of said plurality of switches.

4. A storage system comprising:

a first channel interface connected to a first host computer;

a second channel interface connected to a second host computer;

a first disk interface connected to a first disk device;

a second disk interface connected to a second disk device;

a cache memory configured to store data accessed to said first and second disk devices temporarily;

a first selector connected to said first channel interface and said first disk interface and said cache memory; and a second selector connected to said second channel interface and said second disk interface and said cache memory, wherein an amount of bandwidth of access paths connected to said first selector is wider than an amount of bandwidth of access oaths connected to said second selector.

5. The storage system according to claim 4, wherein said first and second channel interfaces and said first and second disk interface are each connected to two access paths respectively.

* * * * *